TELEPHONE CALL PROGRESS RECORDING SYSTEM

Filed March 6, 1962 20 Sheets-Sheet 1

INVENTOR
R. C. AVERY
BY John C Albert
ATTORNEY

Nov. 17, 1964 R. C. AVERY 3,157,743

TELEPHONE CALL PROGRESS RECORDING SYSTEM

Filed March 6, 1962 20 Sheets-Sheet 2

Nov. 17, 1964 R. C. AVERY 3,157,743

TELEPHONE CALL PROGRESS RECORDING SYSTEM

Filed March 6, 1962 20 Sheets-Sheet 3

Nov. 17, 1964 R. C. AVERY 3,157,743

TELEPHONE CALL PROGRESS RECORDING SYSTEM

Filed March 6, 1962 20 Sheets-Sheet 5

Nov. 17, 1964 R. C. AVERY 3,157,743

TELEPHONE CALL PROGRESS RECORDING SYSTEM

Filed March 6, 1962 20 Sheets-Sheet 6

Nov. 17, 1964 R. C. AVERY 3,157,743

TELEPHONE CALL PROGRESS RECORDING SYSTEM

Filed March 6, 1962 20 Sheets-Sheet 9

Nov. 17, 1964

R. C. AVERY 3,157,743

TELEPHONE CALL PROGRESS RECORDING SYSTEM

Filed March 6, 1962

20 Sheets-Sheet 10

Nov. 17, 1964 R. C. AVERY 3,157,743

TELEPHONE CALL PROGRESS RECORDING SYSTEM

Filed March 6, 1962 20 Sheets-Sheet 13

Nov. 17, 1964 R. C. AVERY 3,157,743

TELEPHONE CALL PROGRESS RECORDING SYSTEM

Filed March 6, 1962 20 Sheets-Sheet 18

United States Patent Office 3,157,743 Patented Nov. 17, 1964

3,157,743
TELEPHONE CALL PROGRESS RECORDING SYSTEM

Robert C. Avery, Jackson Heights, N.Y., assignor to Bell Telephone Laboratories, Incorporated, New York, N.Y., a corporation of New York Filed Mar. 6, 1962, Ser. No. 177,815
19 Claims. (Cl. 179—8)

This invention relates in general to automatic telephone switching systems and more particularly to the recording of call data in such systems.

The development of a nationwide telephone switching network in conjunction with the advent of direct distance dialing between widely separated subscriber stations has greatly increased the traffic handling requirements of long distance trunk facilities. As more and more areas are added to the nationwide telephone network, the administration, engineering and maintenance of long distance facilities becomes increasingly difficult. With the goal of a world-wide automatic telecommunications network becoming a foreseeable probability, it is apparent that accurate equipment and trunk usage information must be available to facilitate proper engineering, design and maintenance of long distance toll switching and trunk facilities.

In the past, traffic analysis of specific trunk routes has been accomplished by counting the number of calls utilizing the particular group of trunks which comprise a trunk group. Although this system of analysis is satisfactory for trunk routes which directly connect an originating switching center with a terminating switching center, severe limitations are encountered when an analysis of trunk routes between tandem switching centers is desired.

A tandem switching center may serve as an originating or a terminating switching center. However, the major function of a tandem switching center is to serve as an intermediate switching point for calls which neither originate nor terminate at the tandem center. As a result, traffic studies which use the call counting arrangement give no indication of the point at which a call originates or of the switching center to which a call is directed. This information is of primary importance in determining traffic usage patterns in large and complicated toll switching networks.

It is therefore an object of this invention to provide a centralized record of the originating, tandem, and terminating trunk routes used in the completion of a long distance call.

In a complicated nationwide telephone switching network the problem of equipment trouble analysis becomes extremely complex. Accurate trouble analysis requires data identifying the various pieces of switching equipment used in calls which are not properly completed. This data is required since call failures often result only when certain pieces of switching equipment located at different switching centers are used in common for the completion of a particular call. Although facilities are currently provided to record the identification of switching equipment used in each respective portion of a long distance call, originating, tandem and terminating, these facilities are remote from each other, thereby creating considerable difficulty in correlating the records pertaining to a particular call.

It is a further object of this invention to provide a record at a central location of the pertinent originating, tandem and terminating switching equipment used in the completion of a long distance call.

A further result of the accelerated expansion of commercial telephone switching networks is the enlargement of private telephone switching networks. Many large industrial and military organizations are showing an increasing tendency to decentralize both administrative and operational activities. One result of this decentralization is the enlargement of the private intercommunication facilities between the often widely dispersed corporate locations. The trunking facilities between the distant locations of a single company will be limited in traffic handling capacity for economic reasons. It is highly probable that the limited trunking facilities of private switching networks will be insufficient to handle all the calls generated during a peak traffic load period.

The copending application Serial No. 134,633 of J. W. Gorgas, G. A. Hurst, J. S. Pfrommer, and W. H. Scheer describes a switching system wherein calls, which are originated in a private switching network and blocked due to insufficient trunk facilities, are diverted to a large commercial switching network for completion. When a call is diverted to the commercial network it becomes necessary for a call data record to be made thereof to facilitate charging the private network for the use of commercial trunking facilities.

The Gorgas et al. application describes the making of a call data record at the switching location from which a call is diverted to the commercial network. If the diversion occurs at the originating switching center this record may include the directory number of the subscriber station initiating the call, but if the diversion occurs at a tandem switching center the directory number of the calling station is not immediately available to the call data recording equipment at the tandem center. There is no provision made for the automatic association of the calling station directory number with a particular call as it is switched through the tandem switching center. It would be desirable, for facilitating automatic processing of billing records, to record the tandem switching center identification and the other call data required for billing on the same recording medium. At present most automatic accounting records are recorded on a perforated paper tape medium.

It is therefore a further object of this invention to provide a centralized record of call data pertaining to calls diverted from a private switching network to a commercial switching network which record includes the directory number of the calling station and identification of the private switching center from which the call is diverted, among other items of pertinent billing data.

These and other objects of this invention are attained in one specific illustrative embodiment wherein signals identifying the switching centers and switching equipment used in completing the tandem and terminating portions of a long distance call are automatically transmitted from the tandem and terminating switching centers in which the call is switched to a call data recording location.

In accordance with one feature of the invention, a call data signal receiver is connected to the outgoing trunk used in the completion of a long distance call at the switching center from which the call originates. The receiver remains connected to the outgoing trunk until the called station answers or the calling station disconnects. A call data signal generator is connected to the incoming tandem trunk at the tandem switching center through which the call is switched. The generator transmits switching center identification signals and switching equipment identification signals back to the receiver at the call originating switching center.

In accordance with a further feature of this invention, an audible signal recording device is permanently associated with the call data receiver at the originating switching center to record switching equipment and switching center identification signals received from the tandem and terminating switching centers in which the call is switched.

In accordance with another feature of this invention, the connection of the receiver to the outgoing trunk at the originating switching center is selectively controlled by a marker in accordance with established criteria, for example call destination, the type of traffic represented by the call, et cetera, and the connection of the generator to the tandem incoming trunk at the tandem switching center is selectively controlled by a marker in accordance with similar established criteria.

In accordance with a further feature of this invention, a call-diverted signal is transmitted by the signal generator at the tandem switching center to the signal receiver at the originating switching center when a call is diverted from a private switching network to a commercial switching network, and, responsive to the call diversion signal, the signal receiver at the originating switching center causes a special billing record to be made of the identity of the tandem switching center from which the call was diverted.

In accordance with another feature of this invention the special billing record is recorded on the same recording medium as the call data identifying the calling station, the outgoing trunk, the time of called station answer and the time of called or calling station disconnect.

In accordance with another feature of this invention, the signal generator at the tandem switching center transmits a trouble-encountered signal to the signal receiver at the originating switching center in response to a call failure at the tandem switching center.

These and other objects and features of the invention will be more apparent from a consideration of the following description when read in connection with the drawing, in which:

FIGS. 1, 2, and 3 are a general block diagram of a switching system in accordance with one specific illustrative embodiment of this invention;

Figure 1:
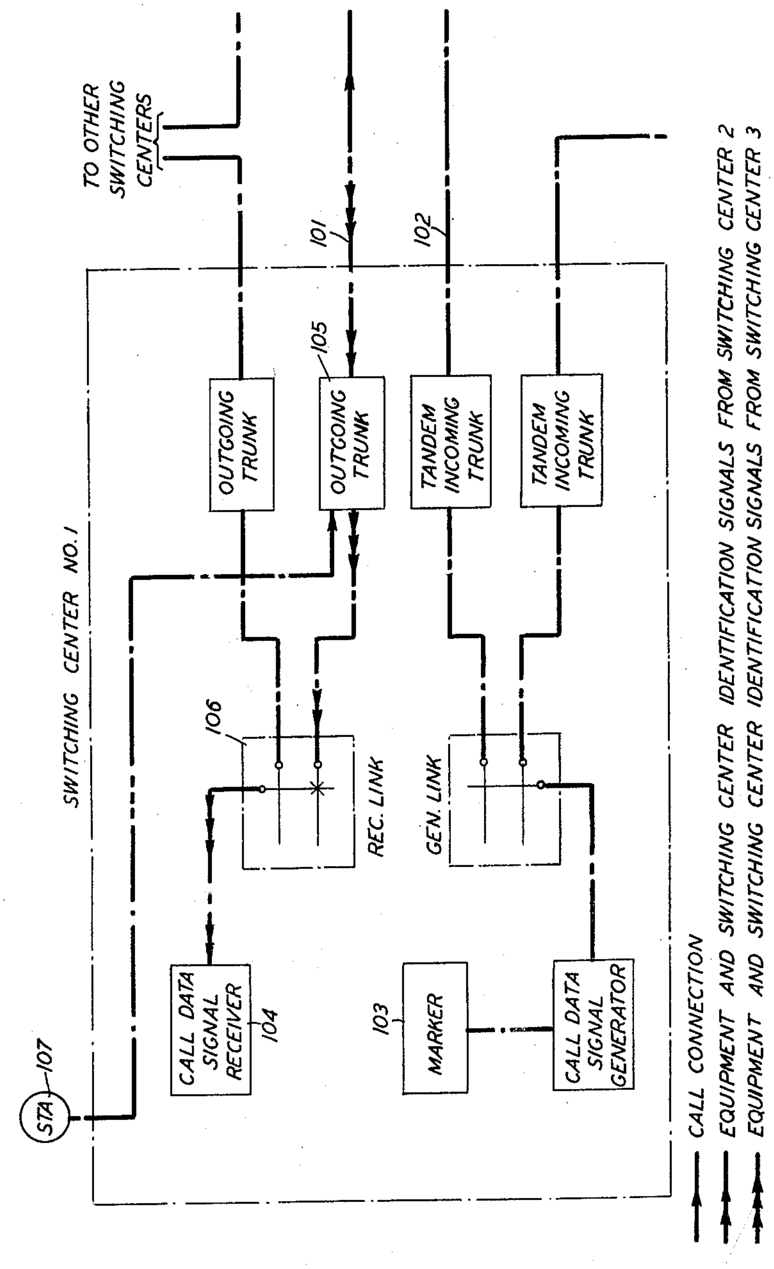

Although this invention is applicable to any telephone switching system, it is described herein in terms of its applicability to a crossbar telephone system. Patent 2,585,904 to A. J. Busch of February 19, 1952, describes a crossbar telephone system. Patent 2,587,817 to A. J. Busch et al. describes the tandem operation of the system described in the Busch patent, supra. Patent 2,599,358 to H. D. Cahill et al. of June 3, 1952, describes call data recording equipment and its operation in association with the crossbar telephone system of the Busch patent.

It is believed that by excluding most of the massive amount of circuit detail of the above-mentioned patents from the drawing and by including it herein by reference only, a basic understanding of this invention will be more easily attained. However, it is believed that by reference to the above-mentioned Busch, Busch et al. and Cahill et al. patents a more complete understanding of the construction and operation of such parts of the telephone system that are not herein shown in detail will be attained, and that the operation of the present invention will be more clearly comprehended.

Figure 2:
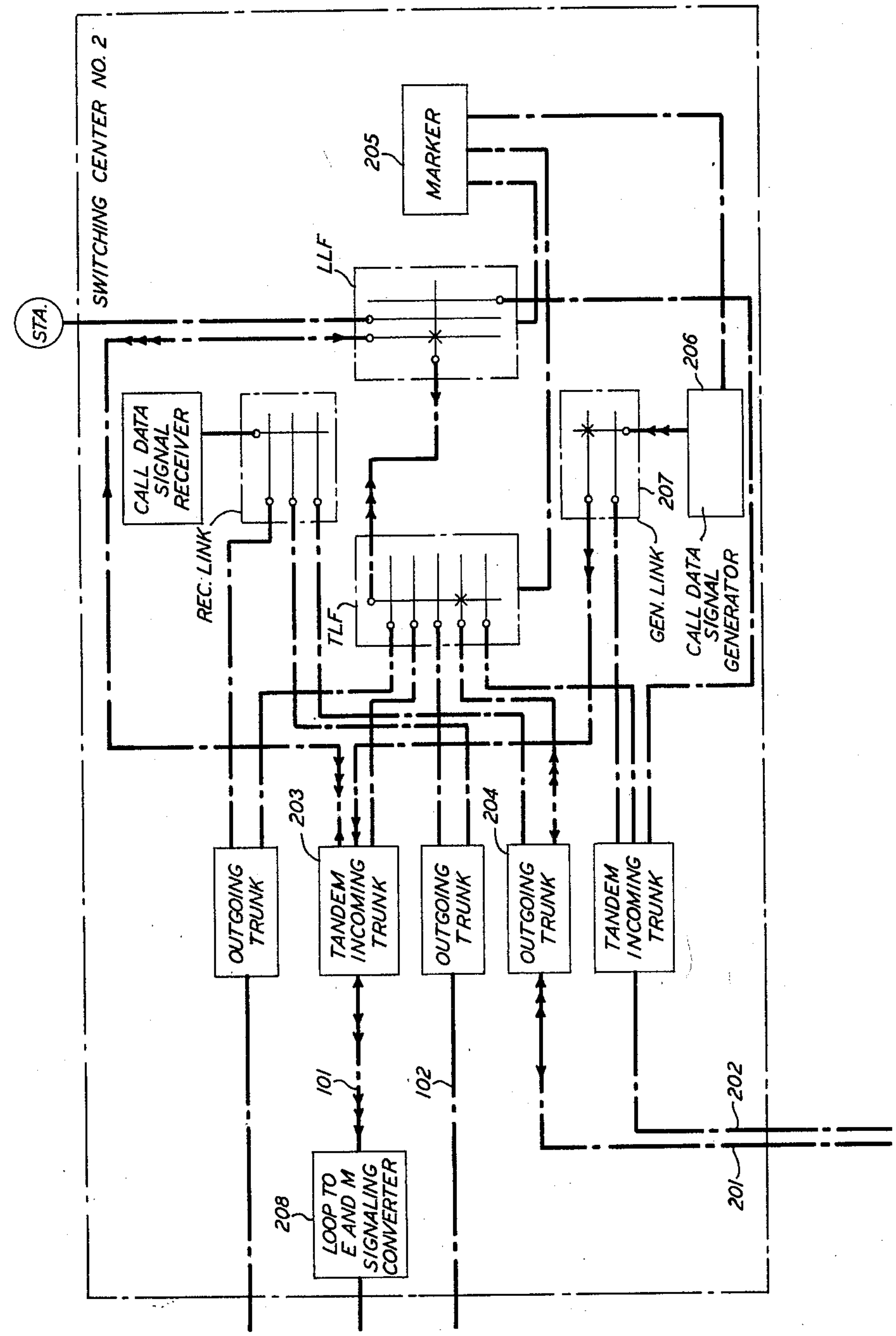
Figure 3:
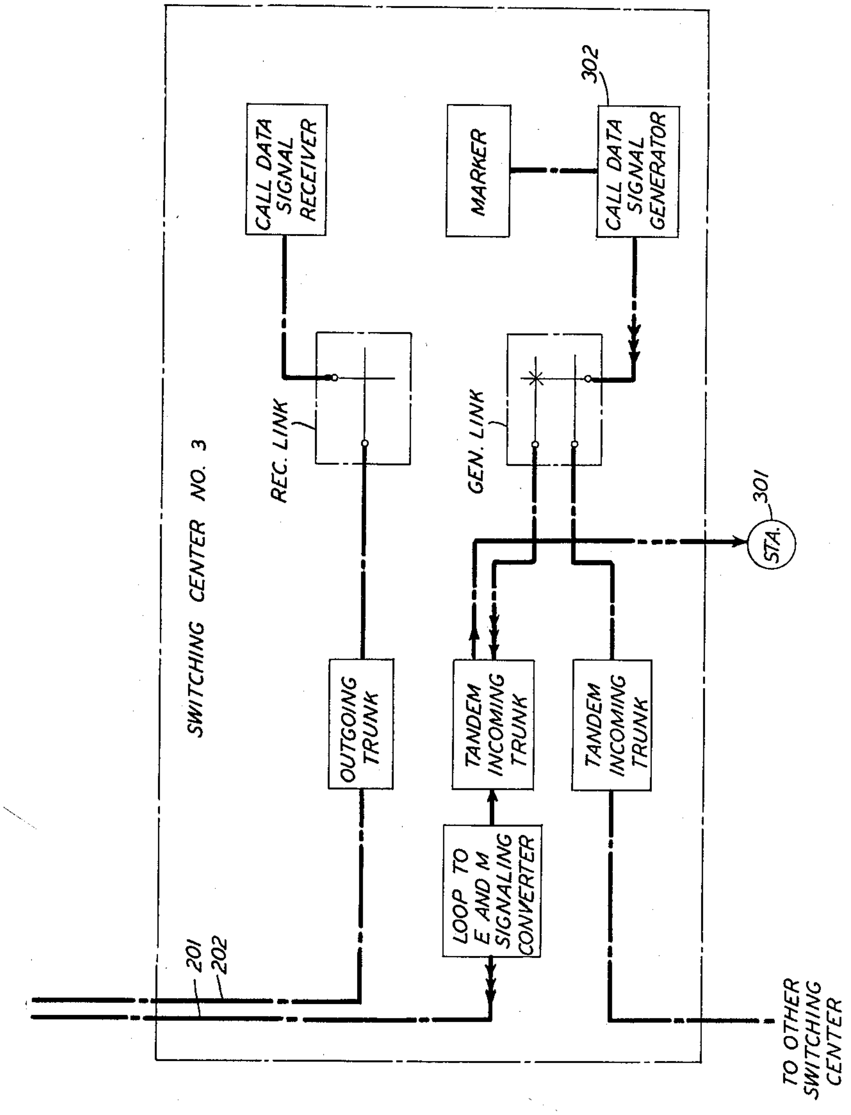

In order to illustrate the operation of a switching system in accordance with the present invention, in one specific embodiment shown in FIGS. 1, 2, and 3, three identical switching centers, identified as switching centers 1, 2, and 3, are interconnected by trunks 101, 102, 201, 202. A call originated at switching center 1 and directed to switching center 3 is switched on a tandem basis through switching center 2. The common control circuit of switching center 1, herein called the marker 103, ascertains that a call progress record of the pertinent switching equipment used in completing the call is required. The marker 103 of switching center 1 then controls switching equipment in switching center 1 to connect a multifrequency receiver 104 to the outgoing trunk circuit 105 used to complete the originating portion of the call, through a receiver link circuit 106.

During the tandem portion of the call at switching center 2 and while the tandem incoming trunk 203 from switching center 1 is being connected to an outgoing trunk 204 to switching center 3, the marker 205 of switching center 2 controls switching equipment in switching center 2 to connect a multifrequency generator 206 to the tandem incoming trunk 203 from switching center 1 through a generator link 207. The marker 205 of switching center 2 collects information identifying the pertinent pieces of switching equipment used in switching center 2 in completing the tandem portion of the call and forwards this information to the generator 206. The generator 206 then transmits the equipment identifying signals and a signal identifying switching center 2 to switching center 1. This call progress information is received by the receiver 104 at switching center 1 which makes a permanent record thereof. If more than one tandem switching center is used to complete the call, each switching center so used will return information identifying itself and the switching equipment used therein to complete the call in progress.

The single arrows in FIGS. 1, 2, and 3 indicate the call connection as it is established from a calling station 107 at switching center 1 through switching center 2 to a called station 301 at switching center 3. The double arrows indicate the circuit over which equipment and switching center identification signals are returned from the generator 206 at switching center 2 to the receiver 104 at switching center 1. The triple arrows indicate the circuit for similar signals from the generator 302 at switching center 3 to receiver 104 at switching center 1.

Figure 20:
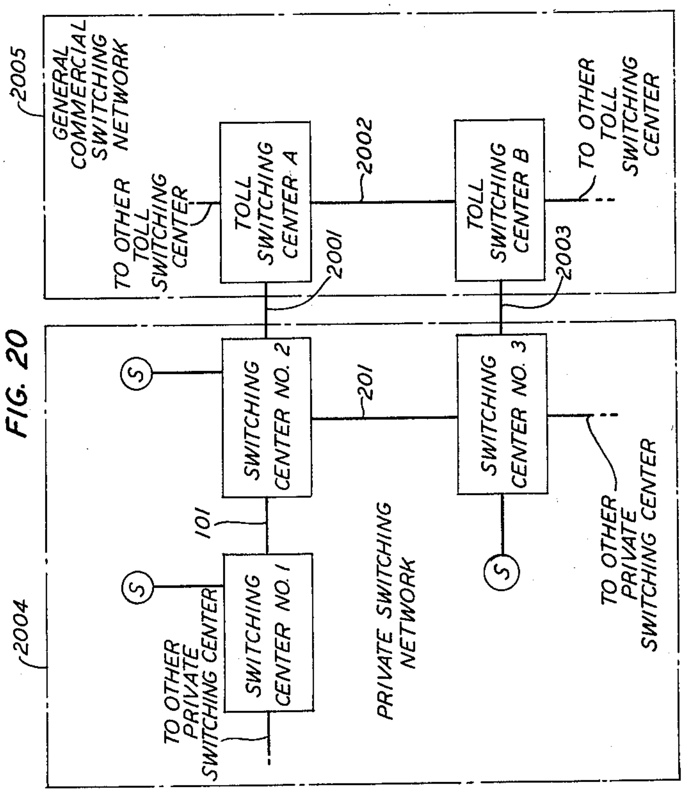
FIG. 20 is a general block diagram illustrating a private network of switching centers in association with a general commercial network of switching centers.

The above-mentioned Gorgas et al. application describes the diversion of a call from a private switching network to a commercial switching network in response to an all trunks busy condition. FIG. 20 is illustrative of such a call. A call originated at switching center 1(20) which is directed to switching center 3(20) is normally completed over trunk 101(20), through a tandem connection in switching center 2(20) and over trunk 201(20) to switching center 3(20). However, in the event that trunk 201(20) is already in use, the call will be completed through the commercial switching network 2005. Tandem connections are established in switching center 2(20) of the private network 2004 and switching centers A and B of the commercial network 2005 which connect trunk 101(20) with trunk 2001, trunk 2001 with trunk 2002, and trunk 2002 with trunk 2003, respectively, thereby completing the call connection from switching center 1(20) to switching center 3(20). The call is said to "spillover" from the private switching network 2004 to the commercial switching network 2005.

GENERAL DESCRIPTION

In one illustrative embodiment of the present invention, three identical tandem switching centers 1, 2, and 3 are interconnected by trunks 101, 102, 201 and 202. These switching centers, although identical, are designated as originating switching center 1, terminating switching center 3, and tandem switching center 2 merely to distinguish between them. The call which will be described to illustrate this embodiment of the invention, will originate from a station 107 served by the originating switching center 1 and will be directed to a station 301 served by the terminating switching center 3. It will be assumed for purposes of this description that the call is switched through the tandem switching center 2. It is, therefore, necessary to perform three basic switching operations: first, an outgoing call at the originating switching center 1; second, a tandem call at the tandem switching center 2; and third, an incoming call at the terminating swtiching center 3.

The drawing, except for FIGS. 1, 2, 3 and 20, is a representation of a single illustrative switching center. In the following description this illustrative switching center is referred to in turn as an originating switching center 1; a tandem switching center 2, and a terminating switching center 3, depending upon which of the above three basic switching operations is being described. It should be understood that each basic switching operation is performed in a different switching center, and that the drawing is merely representative of that switching center, originating 1, tandem 2, or terminating 3, in which the particular switching operation being described is performed.

Figure 4:
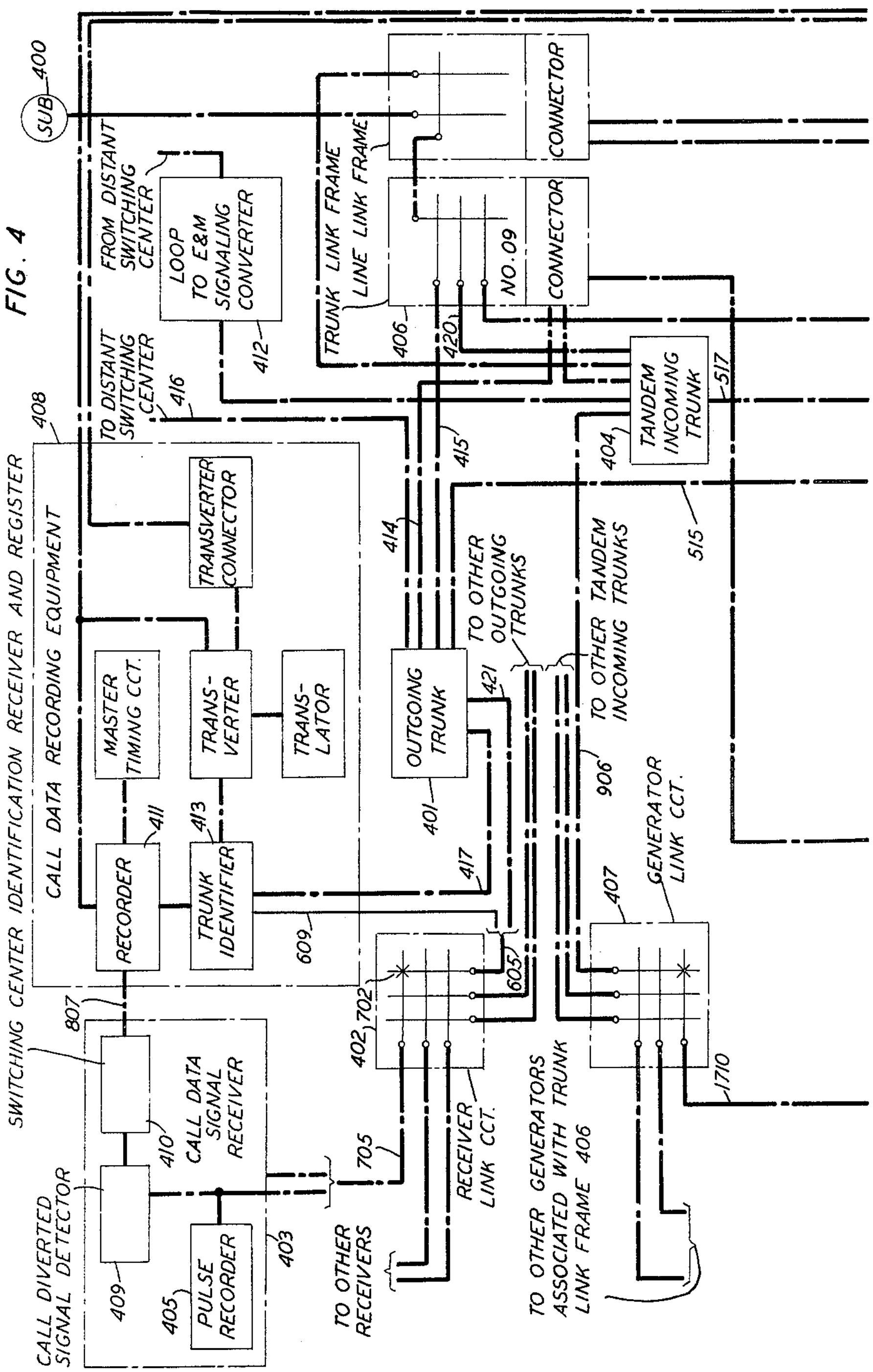
FIGS. 4 and 5 are a more detailed block diagram of the components of one of the switching centers shown in FIGS. 1 through 3.
Figure 5:
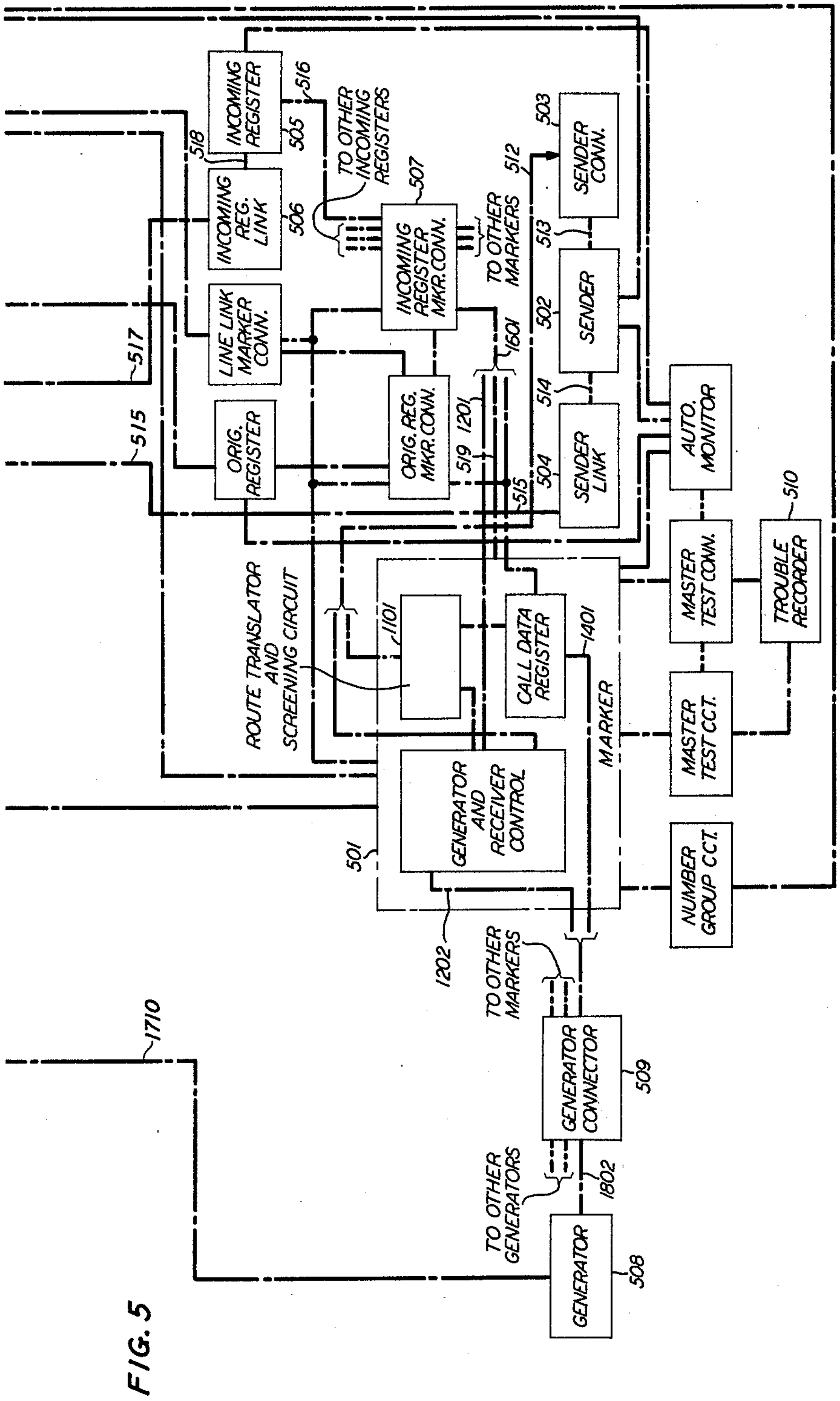
Figure 6:
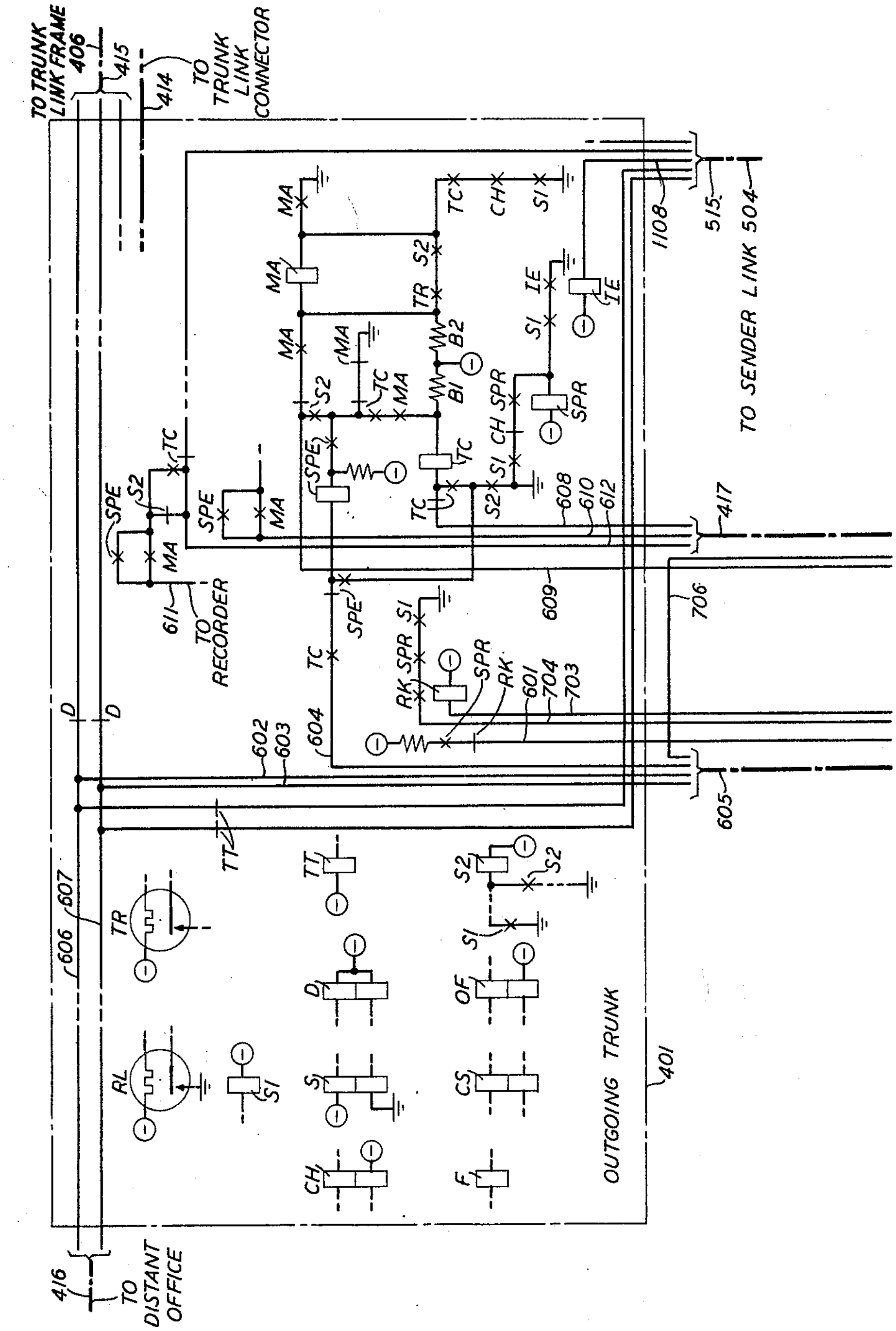
FIGS. 6 through 19 are schematic representations in detached contact form of certain portions of the general components of the switching center shown in FIGS. 4 and 5.
Figure 7:
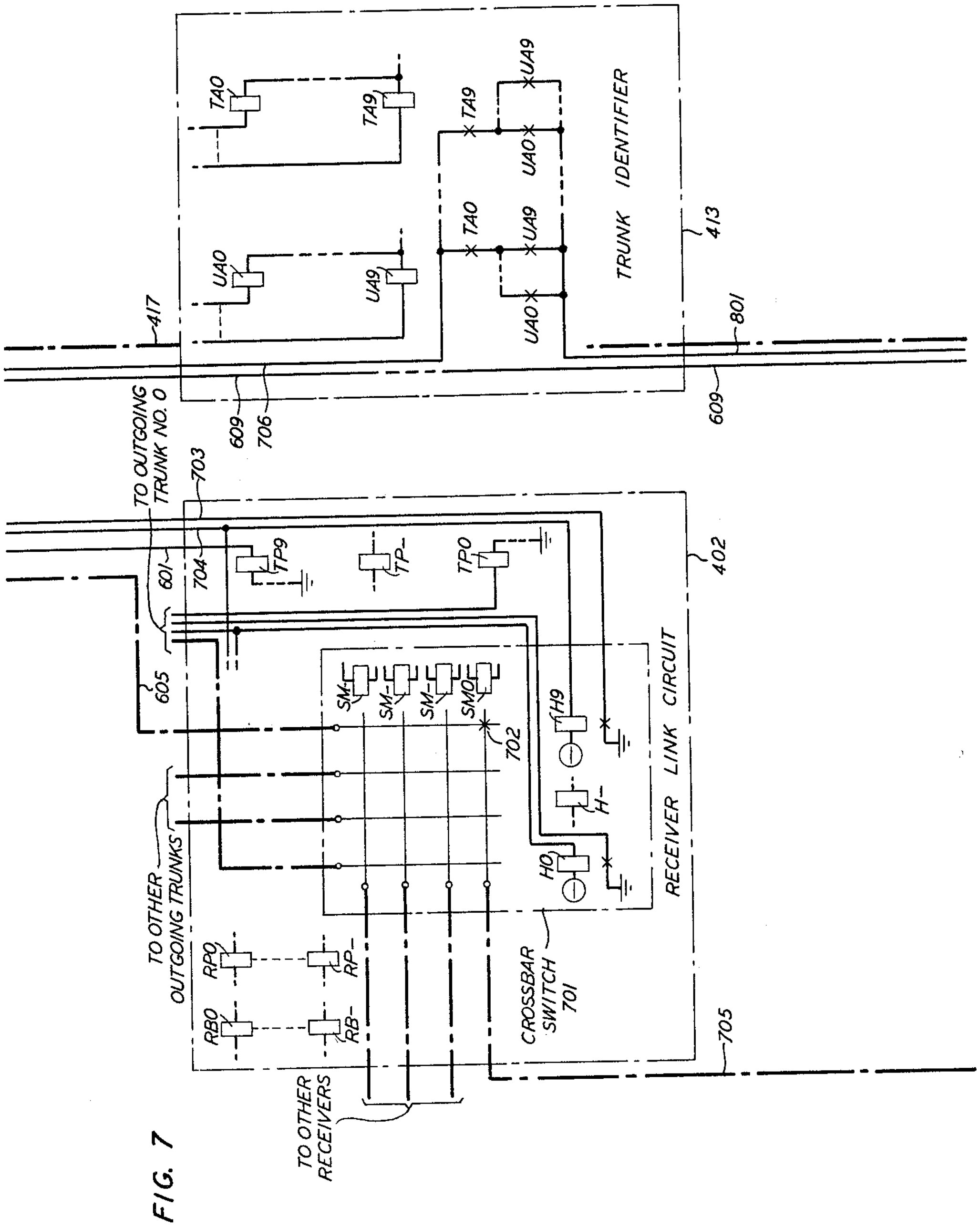
Figure 8:
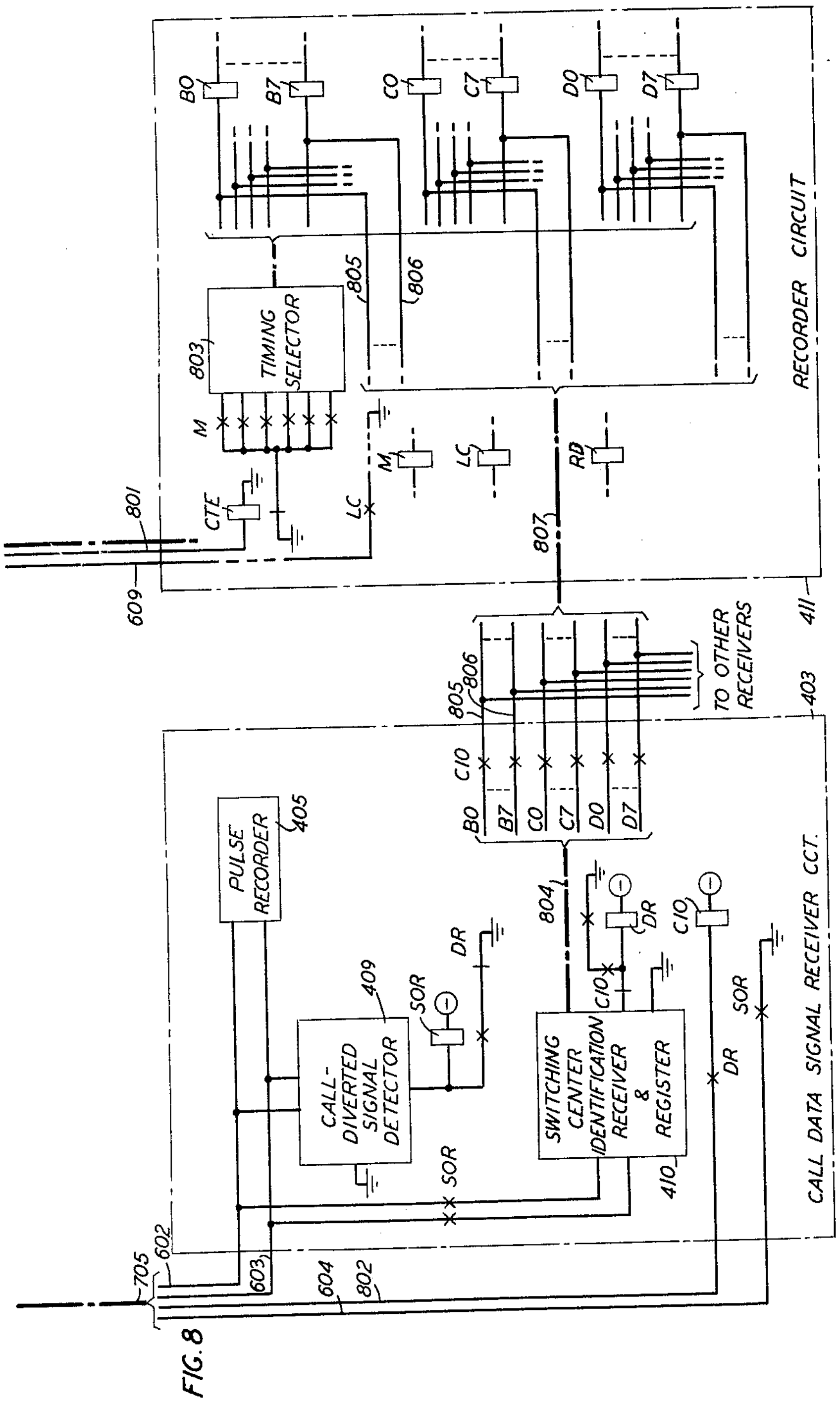

Each component of FIGS. 4 and 5 is assigned a numerical designation. In the description below, this numerical designation will be followed by a digit 1, 2 and 3, indicating the switching center of which it is a component. For example, marker 501–2 indicates the marker of tandem switching center 2.

*Outgoing Call—Originating Switching Center 1*

The patent to Busch supra describes the circuit operations in a crossbar telephone system required to complete an outgoing call. It is assumed that a call originated by a station 400–1 served by the originating switching center 1 has progressed in the originating switching center 1, as described in the Busch patent, to the condition wherein the marker 501–1 has selected an outgoing trunk 401–1 and a sender 502–1 and has established a connection from the marker 501–1 to the outgoing trunk 401–1 through the sender connector 503–1, the sender 502–1, and the sender link 504–1.

As described in the Busch patent and further described in the previously mentioned Gorgas et al. application, the marker 501–1 ascertains from class of service, directory number and type of call treatment information those trunk routes which may be used to complete the call. In the present invention, the marker 501–1 further utilizes the routing and type of call treatment information to ascertain that a complete call progress record is required. When the requirement for such a record is ascertained, a connect-receiver signal is forwarded from the marker 501–1 through the sender connector 503–1, sender 502–1 and sender link 504–1 to the outgoing trunk 401–1.

In response to the connect-receiver signal from the marker 501–1, the outgoing trunk 401–1 signals the receiver link circuit 402–1 to establish the connection from the outgoing trunk 401–1 through the receiver link circuit 402–1 to a call data signal receiver 403–1.

As described in the patent to Busch, upon the completion of certain connection tests, the marker 501–1 signals the sender 502–1 that it may commence pulsing call information to the distant office, which is for this call the tandem switching center 2. The sender 502–1 then awaits a signal from the tandem switching center 2 indicating that an incoming register, such as 505–2, at tandem switching center 2, is connected to the associated tandem incoming trunk, such as 404–2, at tandem switching center 2. Upon receipt of this register-connected signal, the sender 502–1 at originating switching center 1 commences to pulse the pertinent call information over the outgoing trunk 401–1 to the tandem switching center 2.

As previously described, the call data signal receiver 403–1 has been connected to the outgoing trunk 401–1. The pulse recorder 405–1, an audible signal recording device in the receiver 403–1, is connected to the tip and ring conductors of the outgoing trunk 401–1 through the receiver link circuit 402–1. A record of the multifrequency pulses transmitted from the sender 502–1 is made by the pulse recorder 405–1 as the pulses are sent to the tandem switching center 2 over the tip and ring conductors of the outgoing trunk 401–1.

*Tandem Call—Tandem Switching Center 2*

The aforementioned patent to Busch et al. describes the circuit operations for the completion of a tandem call in a crossbar telephone system. The Busch et al. patent describes the seizure of a tandem incoming trunk 404–2 and its connection to an incoming register 505–2 through an incoming register link 506–2. Upon the establishment of this connection the aforementioned register-connected signal is returned from the incoming register 505–2 to the sender 502–1 at the originating switching center 1 causing the sender 502–1 to start pulsing the pertinent call information.

Figure 9:
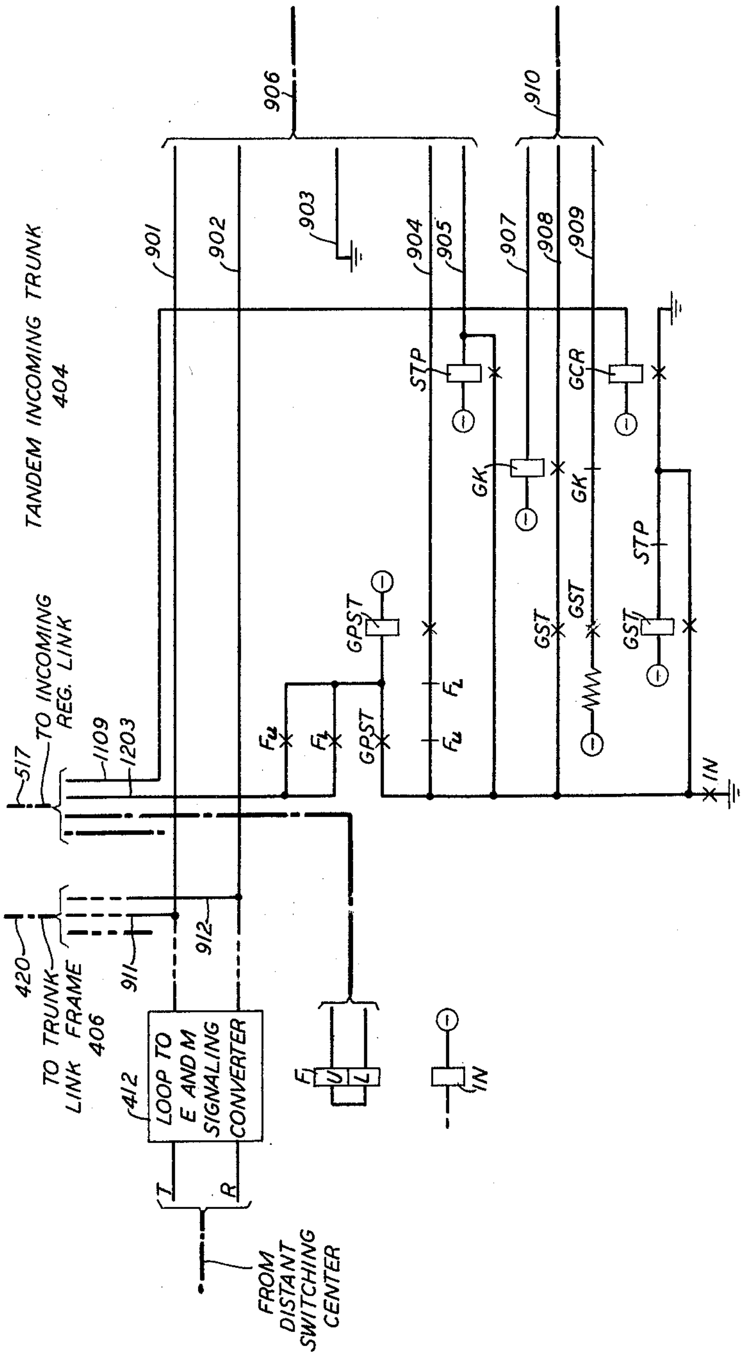
Figure 10:
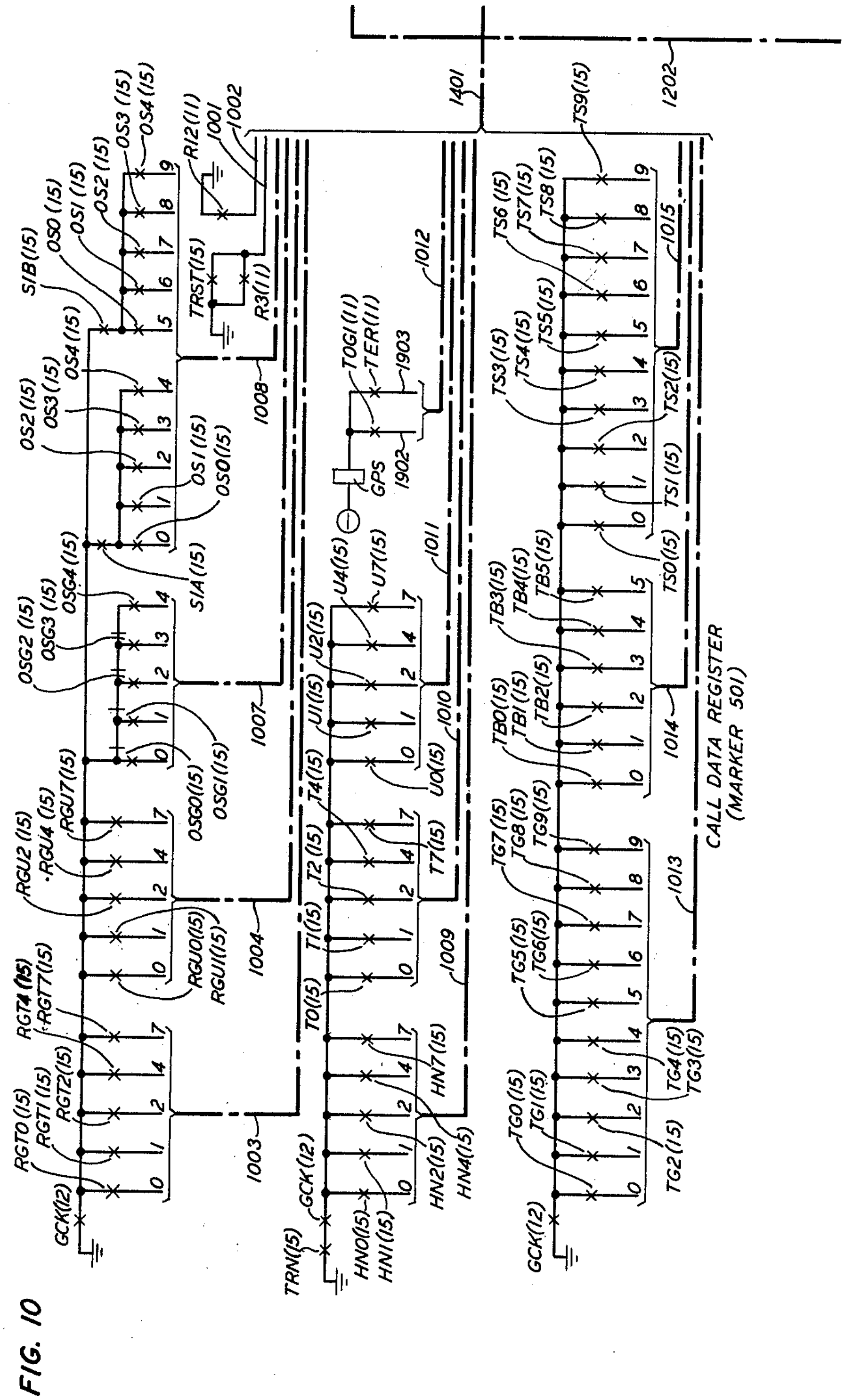
Figure 11:
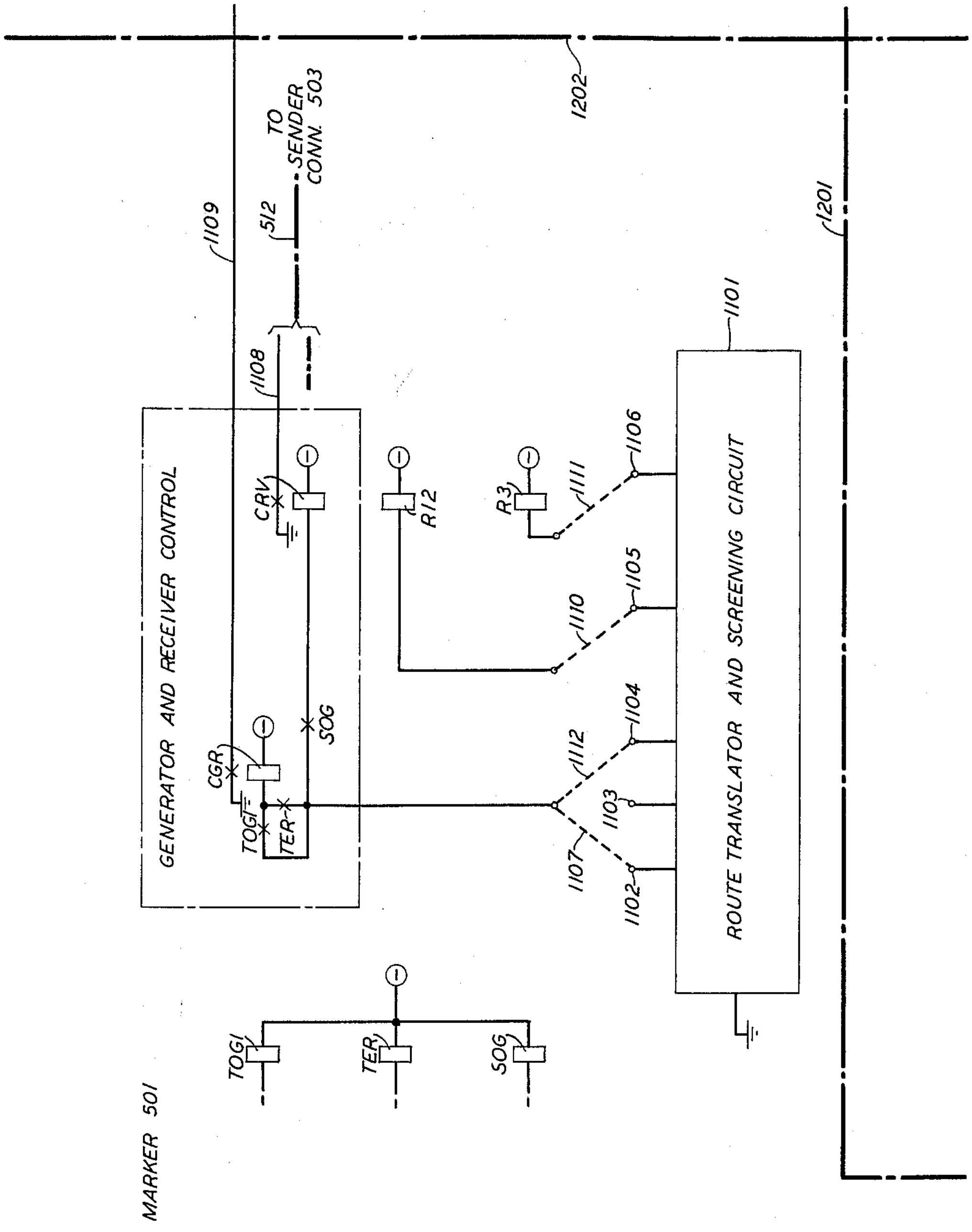
Figure 12:
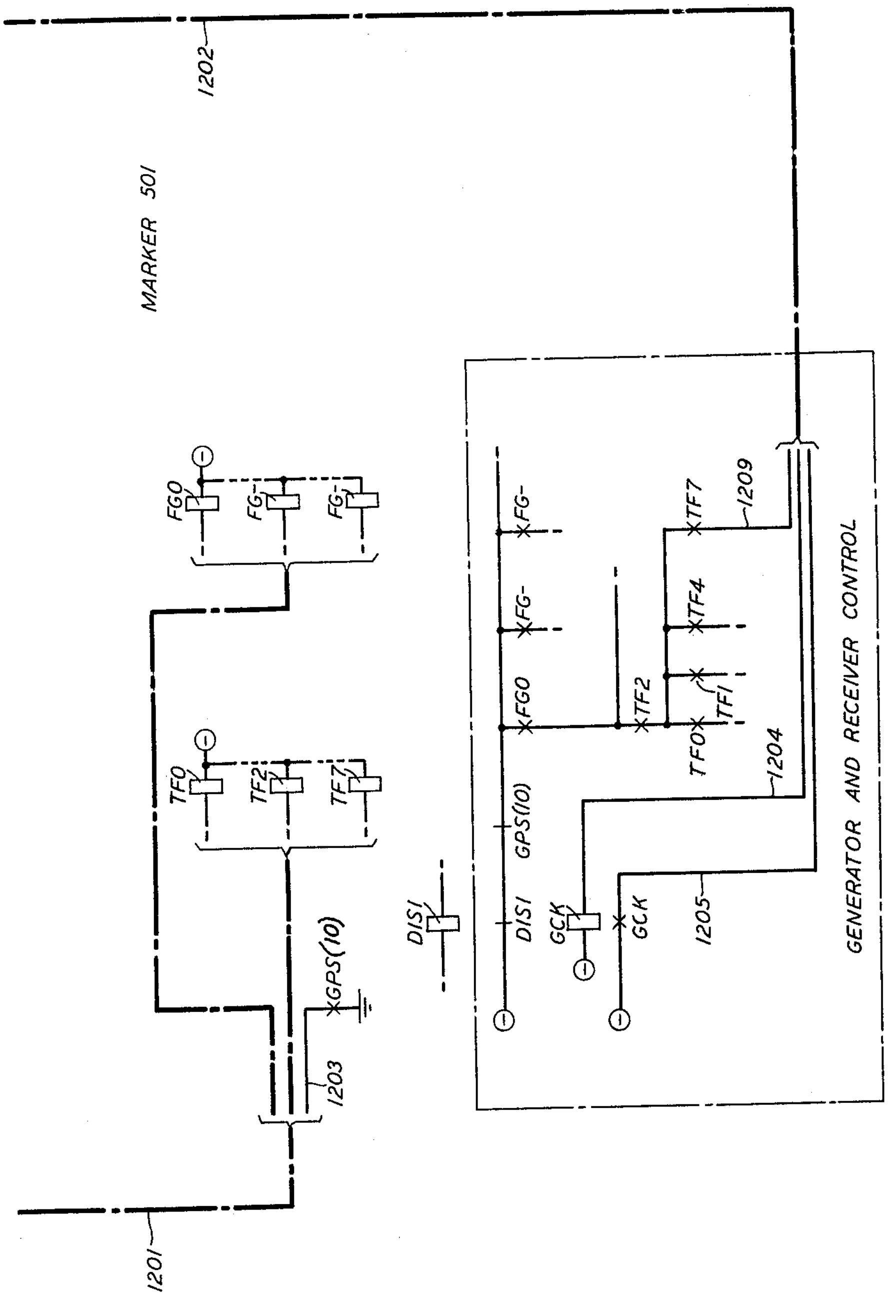
Figure 13:
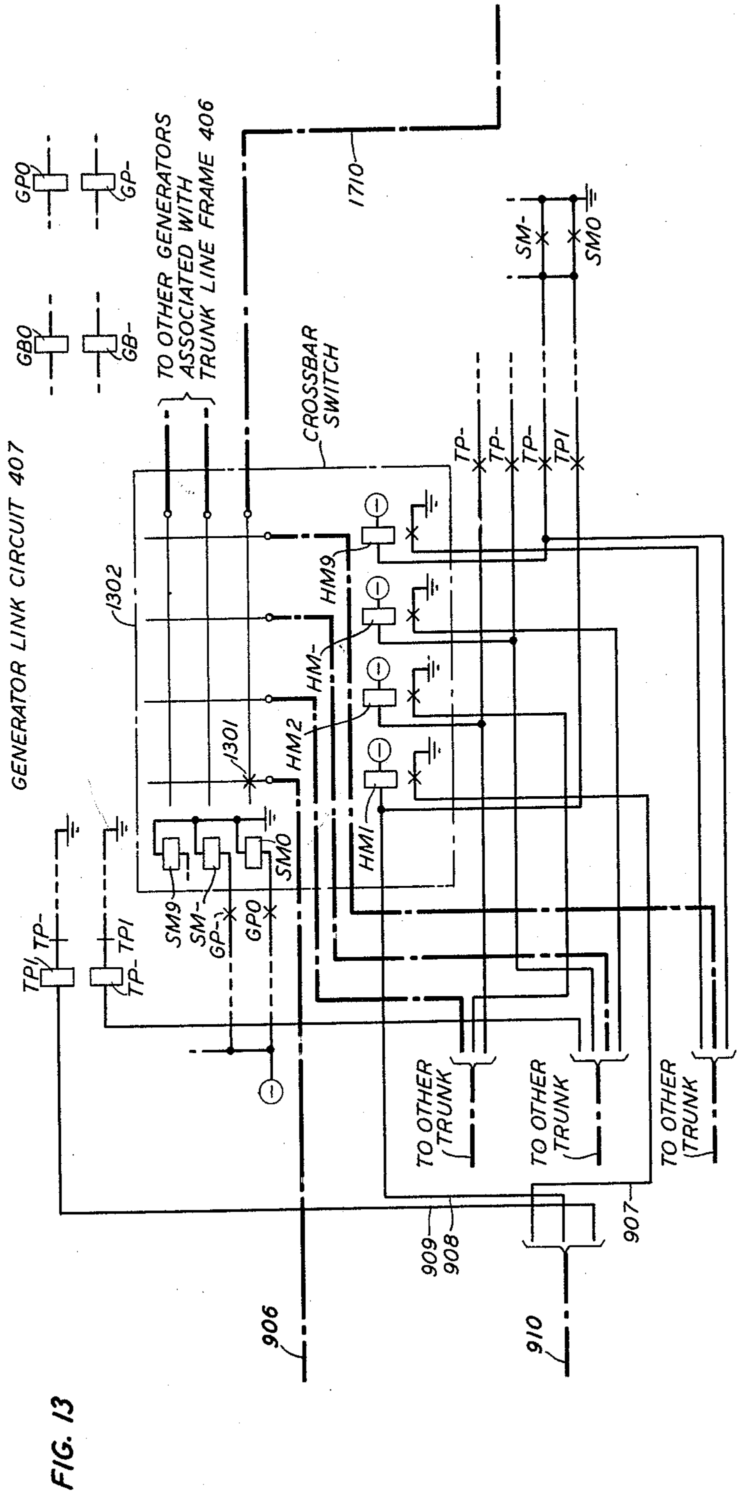
Figure 14:
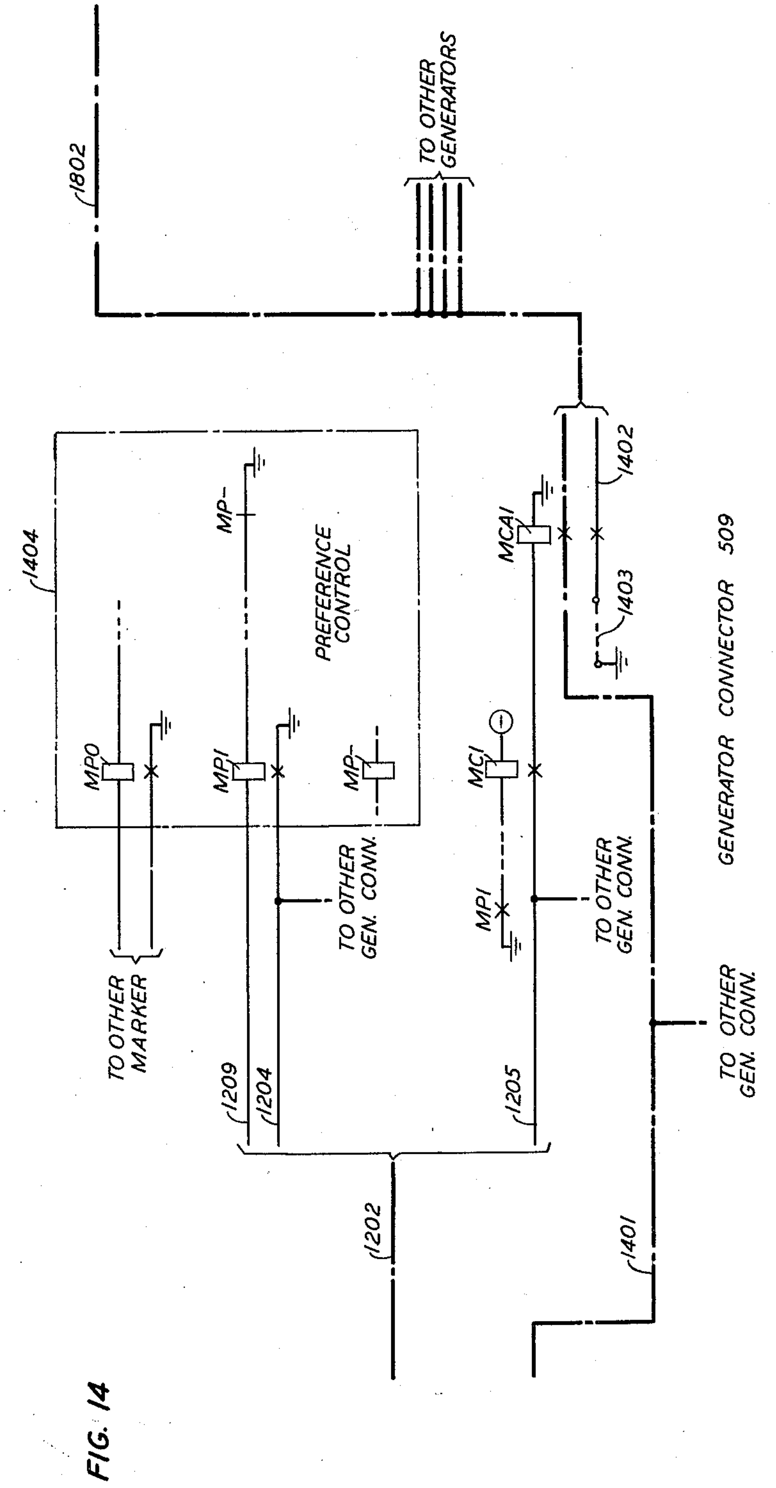
Figure 15:
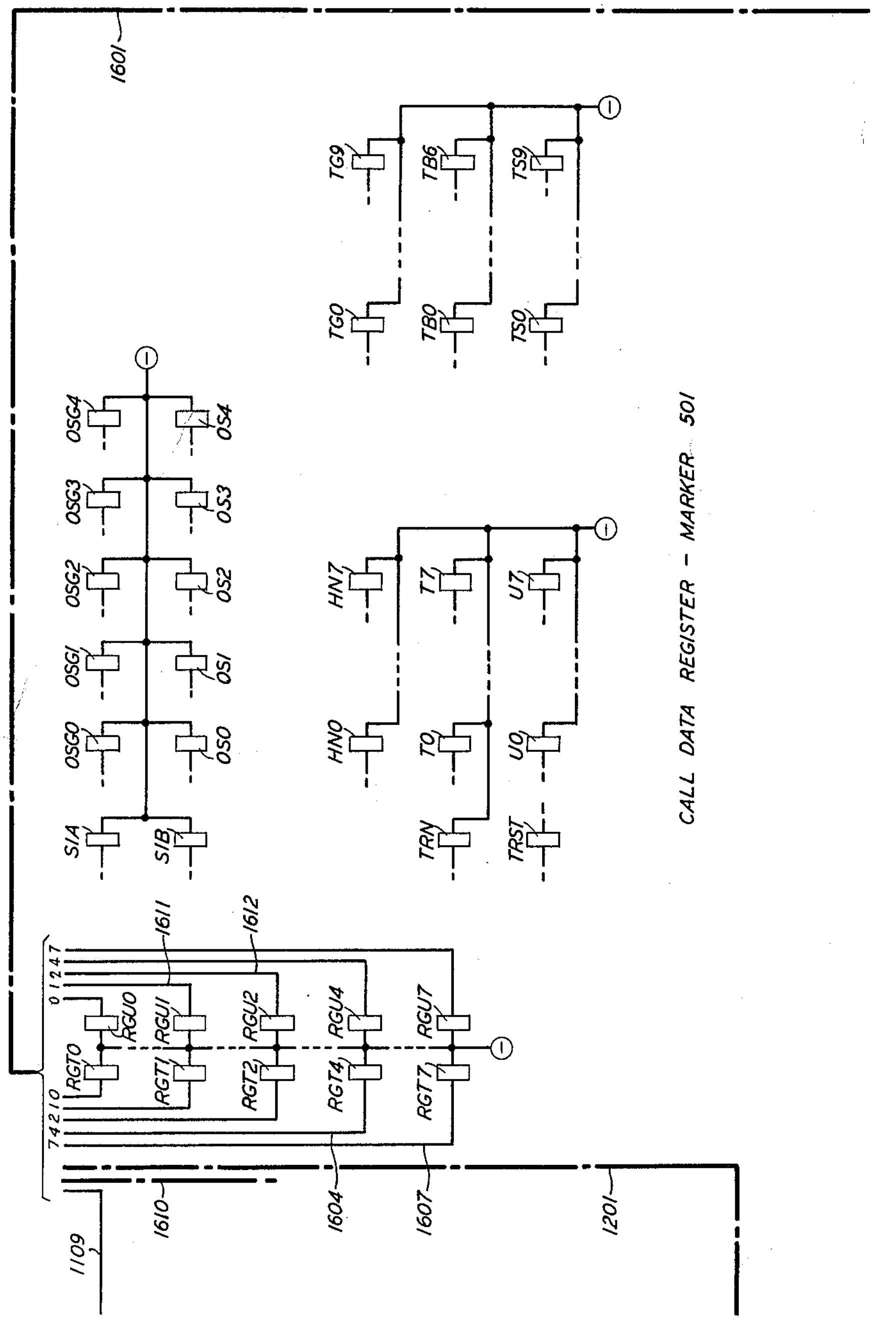
Figure 16:
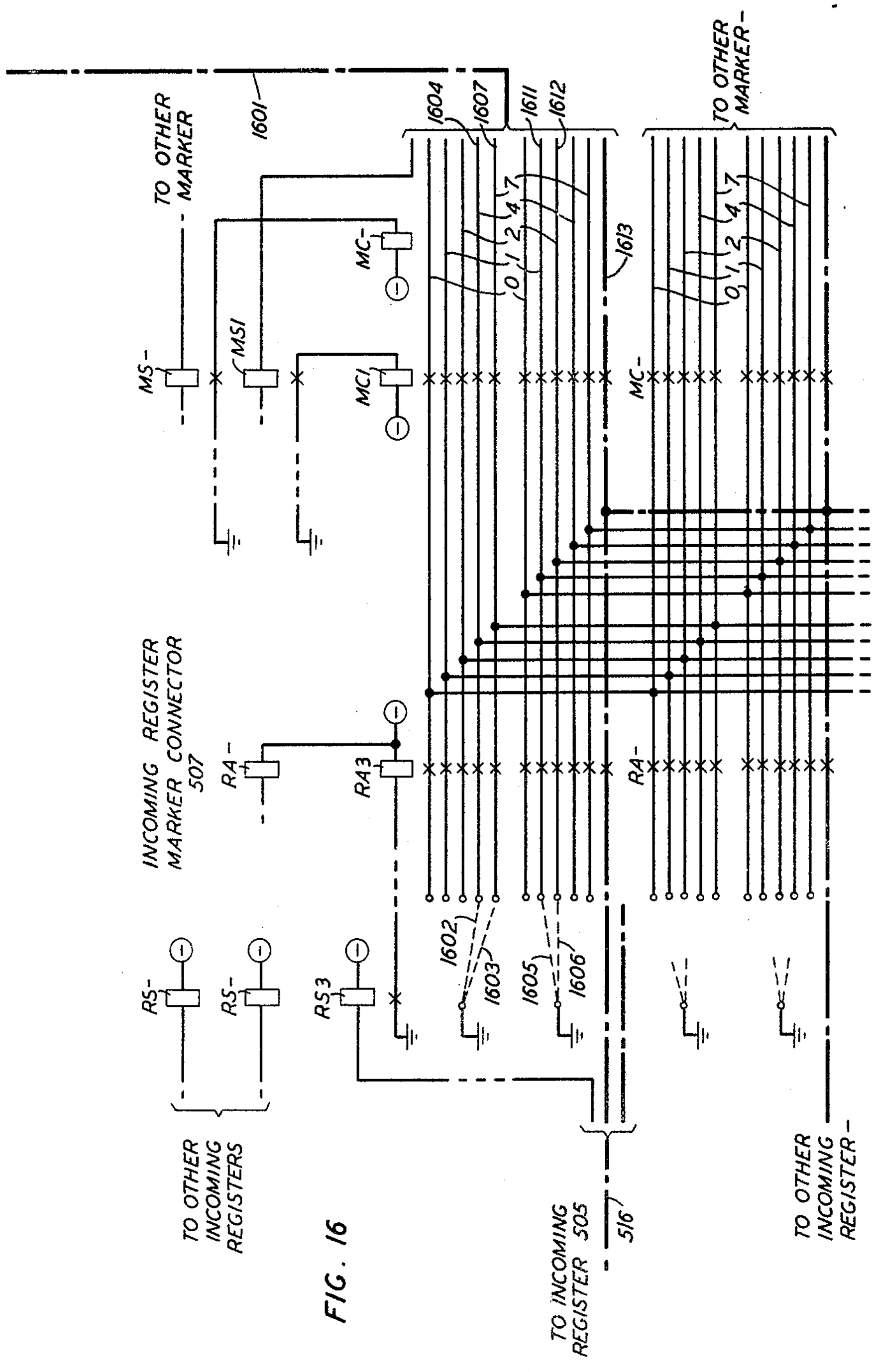
Figure 17:
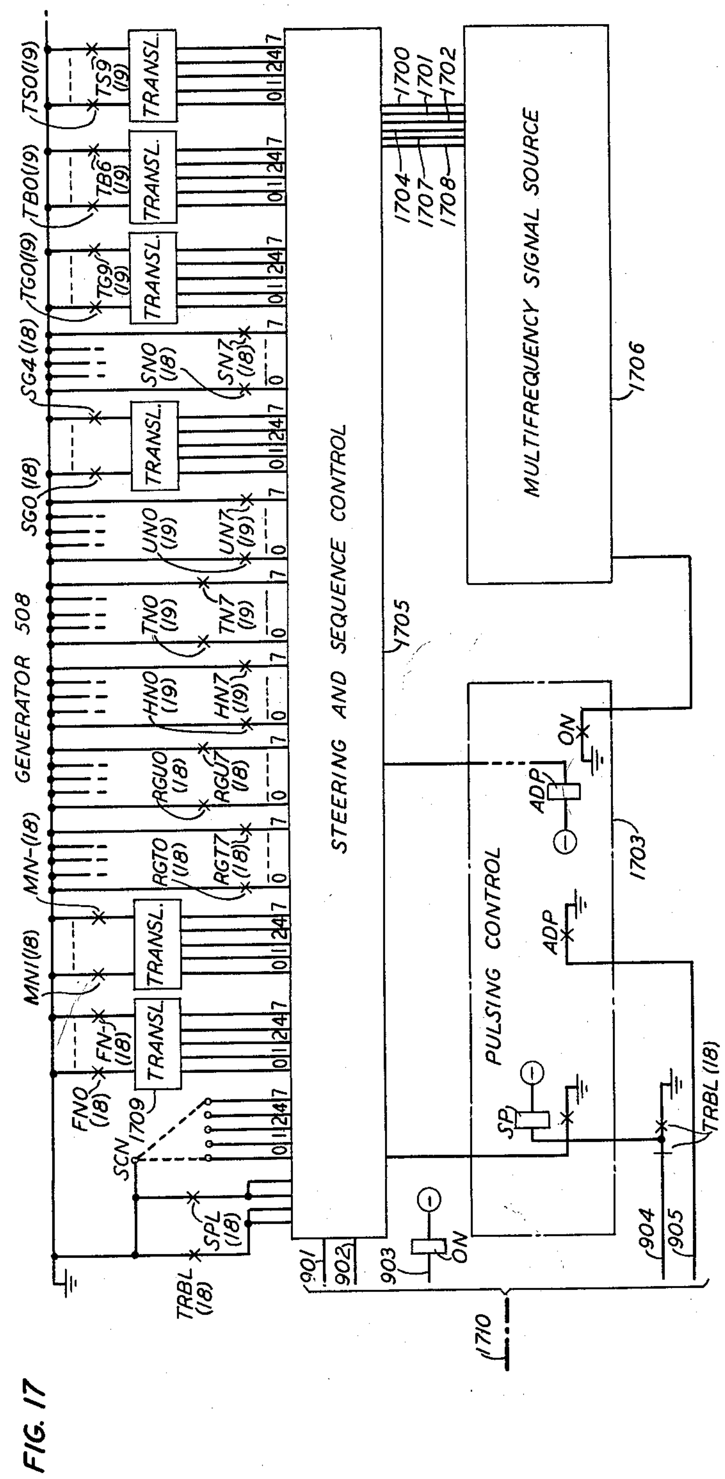
Figure 18:
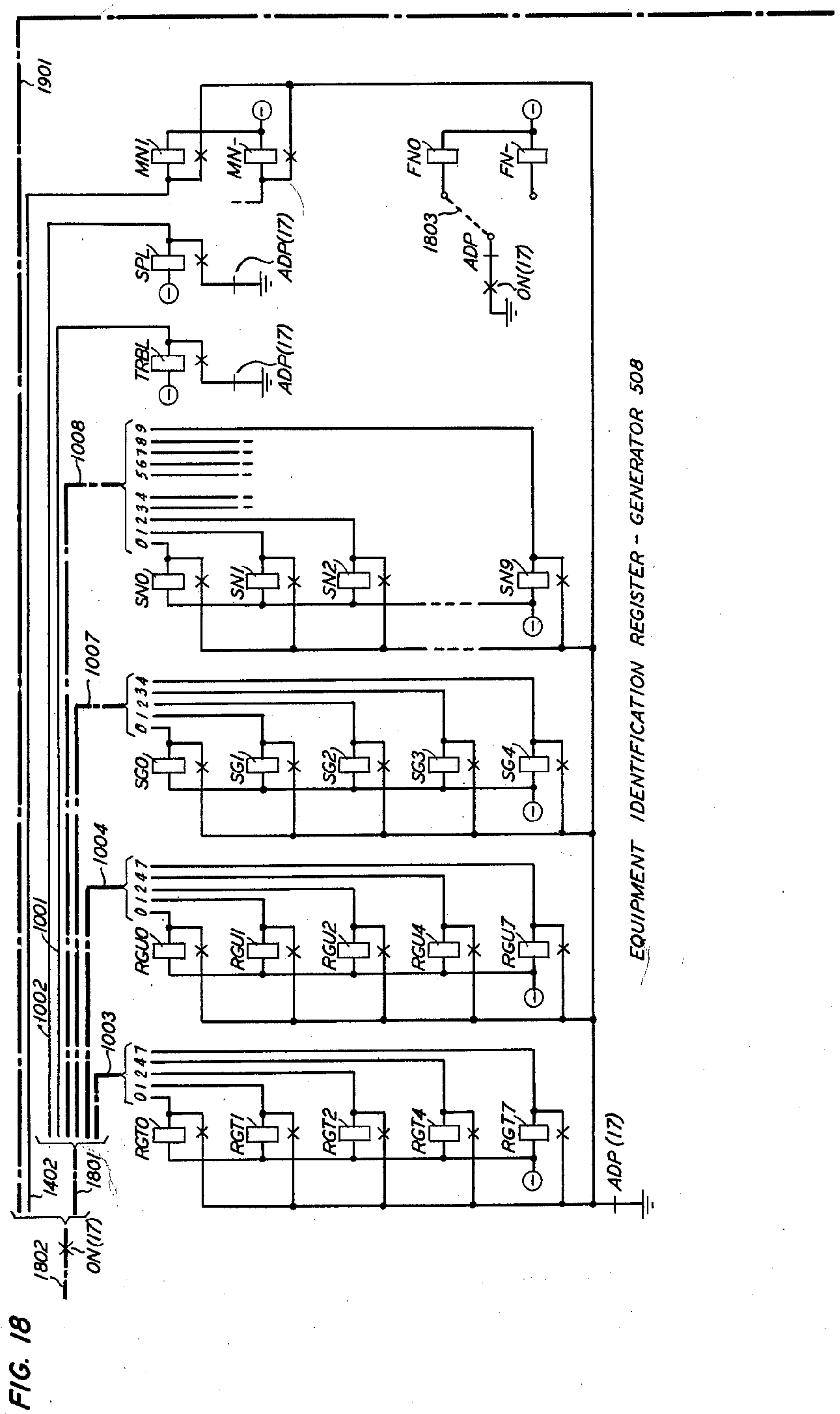
Figure 19:
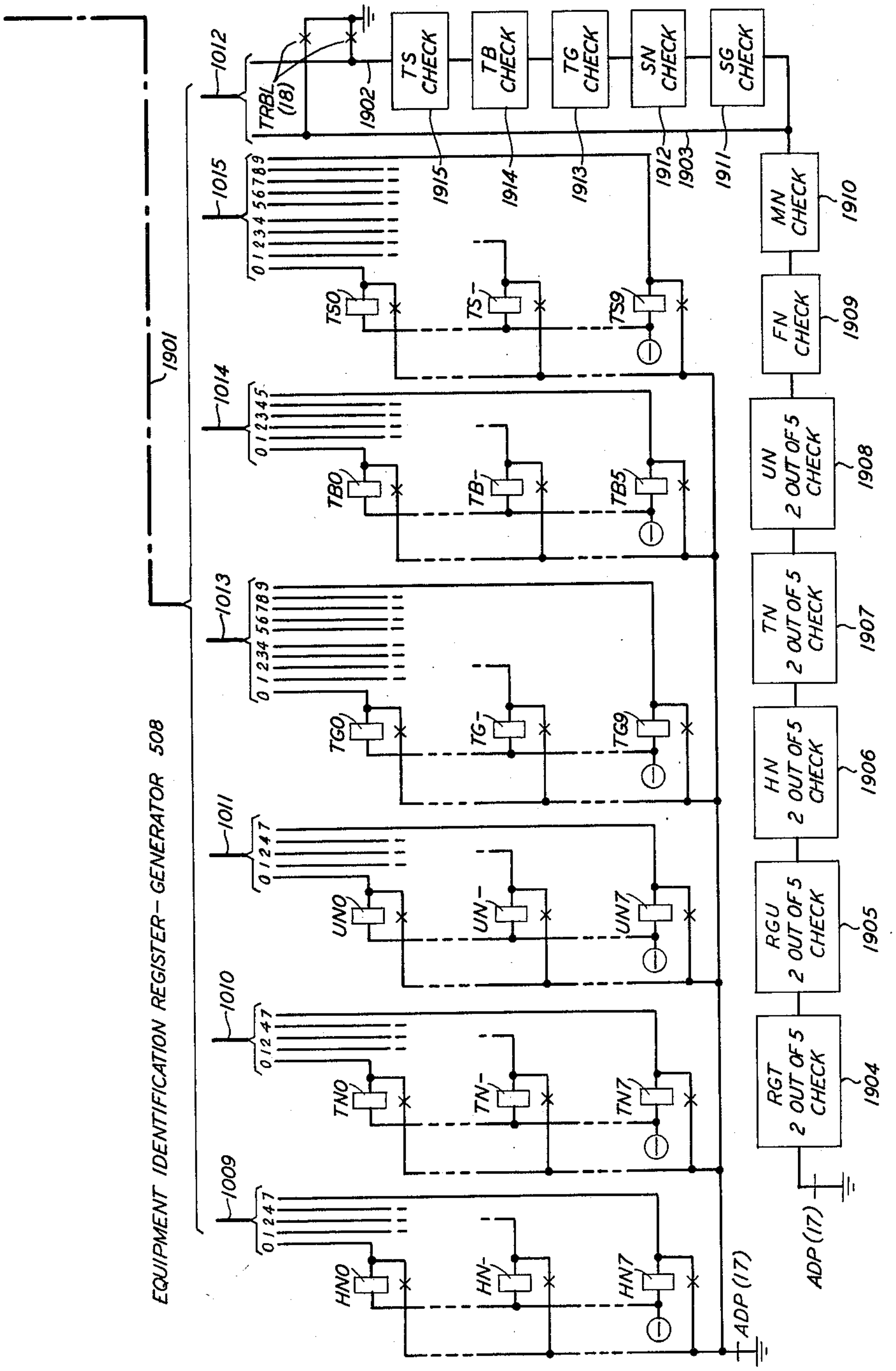
Figure 22:
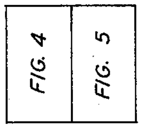
FIGS. 21, 22, and 23 are key diagrams showing how the various figures should be connected together.
Figure 21:
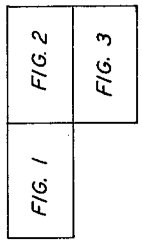
Figure 23:
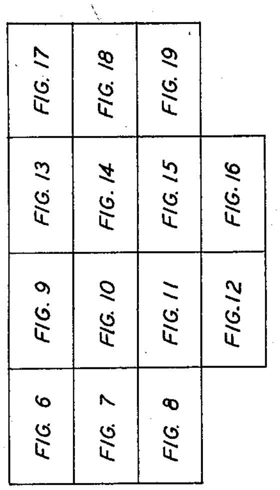

A loop to E and M signaling converter 412–2 has been inserted between the outgoing trunk circuit of the originating switching center 1 and the tandem incoming trunk circuit 404–2 at the tandem switching center 2. This circuit is provided since, in the illustrative circuits being described, the outgoing trunk circuit 401–1 is equipped for loop signaling and the tandem incoming trunk circuit 404–2 is equipped for E and M signaling. Signaling converters of this type are well known in the art and will not be described in detail herein. Loop to E and M signaling converters are discussed in an article entitled "Signaling Systems for Control of Telephone Switching" in the Bell System Technical Journal of November 1960, at pages 1405, et seq. FIG. 9 of this article illustrates the principles of the conversion of loop signaling to E and M signaling.

Upon receipt of the call information from the sender 502–1 at the originating switching center 1, the incoming register 505–2 at the tandem switching center 2 is connected to the marker 501–2 at the tandem switching center 2 through the incoming register marker connector 507–2. The marker 501–2 receives equipment identifying signals over this connection which identify the trunk link frame 406–2 upon which the tandem incoming trunk 404–2 appears, the incoming register 505–2 and the tandem incoming trunk 404–2. This information is registered in the marker 501–2.

The marker 501–2 then ascertains from the called station directory number and other class and control information forwarded to it from the incoming register 505–2 that a complete call progress record is required at the originating switching center 1. A connect-generator signal is then forwarded from the marker 501–2 through the incoming register marker connector 507–2, the incoming register 505–2, and the incoming register link 506–2 to the tandem incoming trunk 404–2. In response to this signal the tandem incoming trunk 404–2 signals the generator link circuit 407–2 to establish a connection to an idle one of the call data signal generators associated with the trunk link frame 406–2 upon which the tandem incoming trunk 404–2 appears. A connection is then established from a selected generator 508–2 through the generator link circuit 407–2 to the tandem incoming trunk 404–2.

The marker 501–2 then establishes a connection to the generator 508–2 through generator connector 509–2 under the control of the trunk link frame identifying information which was previously registered in the marker 501–2.

As described in the patent to Busch et al., the marker 501–2 now selects an outgoing trunk 401–2 to the terminating switching center 3 and a sender 502–2 suitable for use with the selected outgoing trunk 401–2.

Equipment identifying signals are now forwarded from the marker 501–2 through generator connector 509–2 to the generator 508–2, which signals identify the incoming register 505–2, the tandem incoming trunk 404–2, the marker 501–2, the selected sender 502–2 and the selected outgoing trunk 401–2. Since the generator 508–2 is associated with only one trunk link frame 406–2 and only one switching center, the information identifying trunk link frame 406–2 and tandem switching center 2 is directly available in the generator 508–2 and it is unnecessary for this information to be forwarded thereto from the marker 501–2.

When the pertinent switching equipment identifications have been received and registered in the generator 508–2, the generator 508–2 transmits this information in the form of multifrequency pulses back over the tip and ring conductors of the tandem incoming trunk 404–2 to the originating switching center 1, wherein it is recorded by the pulse recorder 405–1 of the receiver circuit 403–1. After completing the transmission of all the equipment identifications registered therein, the generator 508–2 is released.

*Tandem Call Failure*

There are several conditions under which a tandem call will fail to be completed. These conditions are described in the patent to Busch. The crossbar telephone system is equipped with a trouble recorder circuit 510–2, as described in Patent 2,508,052 to O. H. Williford of May 16, 1950, which is seized by the marker 501–2 in the event of a trouble condition. As described in the Busch patent, when the switching equipment required to complete the tandem call is busy, an overflow condition is detected by the marker 501–2. In response to either a trouble or an overflow condition a call-failure signal is sent from the marker 501–2 to the generator 508–2 which, in response thereto, transmits a trouble-encountered signal back to the pulse recorder 405–1 of the receiver circuit 403–1 at the originating switching center 1. In addition to the trouble-encountered signal, the generator 508–2 will pulse back any equipment identifying information which it has received and registered prior to the occurrence of the trouble condition. The generator 508–2, after transmitting all of the equipment identification information registered therein, is released.

*Call Diverted Record*

The patent to Cahill et al. supra describes the call data recording equipment 408–1 used for the automatic recording of pertinent billing information relating to outgoing calls. It is desirable that any call data record which is to be used for billing purposes should be recorded on the perforated tape described in the Cahill et al. patent to facilitate its processing and association with other pertinent billing data pertaining to the call, such as time of answer, time of disconnect and calling station directory number.

The Cahill et al. patent describes the recording of an initial call data record entry which includes the calling station directory number, the identity of the outgoing trunk, and other pertinent call data. The Cahill et al. patent further describes the call data record entry which is made when a called station answers. This answer entry includes the identity of the outgoing trunk, to facilitate association of the answer entry with the above-described initial call data entry, and the time the called station answers. In the present invention the call-diverted entry also includes the identity of the outgoing trunk, but indicia identifying the tandem switching center from which the call is diverted is substituted for the time indication.

As described in the Gorgas et al. application, the marker 501–2 at the tandem switching center 2 ascertains when a trunk route is selected from a private switching network to a commercial switching network. This trunk route is known as a "spillover" route. Upon ascertaining that a spillover route has been selected, the marker 501–2 signals the generator 508–2 that the transmission of a call-diverted signal should precede the transmission of other equipment and switching center identifying information back to the originating switching center 1. The generator 508–2 is arranged so that the siganls identifying the tandem switching center 2 will be transmitted immediately following the call-diverted signal.

The receiver circuit 403–1 at the originating switching center 1 is equipped with a call-diverted signal detector 409–1 and a switching center identification receiver and register 410–1. Upon detecting a call-diverted signal, the detector 409–1 extends the connection from the tip and ring conductors of the outgoing trunk 401–1 to the switching center identification receiver and register 410–1. The identity of the tandem switching center 2 is received and registered in the switching center identification receiver and register 410–1 at originating switching center 1 as it is transmitted from the generator 508–2 at the tandem switching center 2. Upon receipt of the switching center identity, the switching center identification receiver and register 410–1 at originating switching center 1 is disconnected from the tip and ring conductors of the outgoing trunk 401–1, however the pulse recorder 405–1 remains connected thereto to receive and record the signals identifying the switching equipment used at the tandem switching center 2.

In response to the call-diverted signal, the detector 409–1 at originating switching center 1 signals the outgoing trunk 401–1 through the receiver link circuit 402–1 to establish a trunk identifying connection from the outgoing trunk 401–1 to the call data recording equipment 408–1. The establishment of this connection is described in the Cahill et al. patent. Upon receipt of the switching center identification, the switching center identification receiver and register 410–1 establishes a connection to the recorder 411–1. The identity of the tandem switching center 2 is then forwarded over this connection to the recorder 411–1 and recorded thereby in association with the identity of the outgoing trunk 401–1. Upon completion of the recording operation the call data recording equipment 408–1 is released.

The receiver 403–1 remains connected to the tip and ring conductors of the outgoing trunk 401–1 and records in the pulse recorder 405–1 all call progress signals received until either the call station 400–3 answers, the calling station 400–1 disconnects, or the outgoing trunk 401–1 is released due to a trouble condition.

The use of perforated paper tape as the recording medium for the call-diverted information is advantageous in that the initial, the answer and the disconnect entries are also recorded thereon. All information required to compute billing charges to the private network is therefore available in a single record.

The pulse recorder 405–1 of the receiver circuit 403–1 at the originating switching center 1 may advantageously comprise a magnetic tape or wire recorder or other audible signal recording device. The signals recorded by the pulse recorder 405–1 are readily available for local analysis or for transmission to a central route and trouble analysis center. The use of separate recording media for call data pertaining to progress records and for call data pertaining to customer billing is particularly advantageous in that the records may be used for their primary functions, namely, trouble and traffic analysis and preparation of customer charges, respectively, without requiring a time consuming and technically difficult separation of the two types of call data from a single recording medium.

*Incoming Call—Terminating Switching Center 3*

The circuit operations required for the completion of an incoming call in a crossbar telephone system are described in the patent to Busch. The call progresses in a manner similar to the tandem call with the exception that the marker 501–3 at the terminating switching center 3 ascertains that the call is directed to a station 400–3 served by the terminating switching center 3. As in the tandem call, the marker 501–ascertains that a complete call progress record is required at the orginating switching center 1. The marker 501–3 then forwards a connect-generator signal to the tandem incoming trunk 404–3 which, as previously described, signals the generator link circuit 407–3 to establish a connection from the tandem incoming trunk 404–3 to a generator 508–3.

As previously described, the marker 501–3 collects switching equipment identifying information and forwards it to the generator 508-3 which, as in the tandem call, transmits identifying signals in the form of multifrequency pulses over the call connection to the receiver 403-1 at the originating switching center 1. The information transmitted is analogous to that transmitted for the tandem call with the exception that neither sender nor outgoing trunk identifying signals are included, since an incoming call does not require the use of this type of switching equipment.

When the incoming call is completed and the called station 400-3 answers, a supervisory signal is returned over the call connection to the outgoing trunk 401-1 at the originating switching center 1. This supervisory signal, among its other functions, initiates the release of the call data signal receiver 403-1.

Trouble and overflow conditions at the terminating switching center 3 result in the transmission of a trouble-encountered signal from the terminating switching center 3 as described for the tandem call.

DETAILED DESCRIPTION

*Component Designations*

For purposes of clarity and ease of reference, certain standard designation methods have been used in FIGS. 6 through 19 of the drawing to which the following description refers.

The operating winding of each relay has been given an alphabetical and, in some instances, a numerical designation. Many of these designations are indicative of the function performed by the associated relay. However, not all of the relays shown on the drawing are given such functional designations. When a relay is referred to in this description, a number in parenthesis will follow the relay designation. This number indicates the number of the figure of the drawing in which the winding of the designated relay is shown. For example, GCK(12) identifies relay GCK whose operating winding is shown on FIG. 12 of the drawing.

The contacts of the various relays are portrayed in detached contact schematic form. Each detached contact or group of detached contacts is labeled with the designation of the relay with which they are associated. To further simplify and condense the drawing a single contact symbol, when associated with a cable rather than a single lead, indicates that each lead included within the cable is associated with a contact of the designated relay. If the operating winding of the relay is not shown on the same figure as a detached contact thereof, the number of the figure on which the operating winding appears is placed in parenthesis following the designation of the relay. For example, ADP(17) identifies a contact of relay ADP whose operating winding is shown on FIG. 17.

Cables, which are indicated in the drawing as heavy lines broken by single dashes, comprise a plurality of leads or smaller cables whose paths parallel each other. Where a cable is terminated at the exterior of a block, its leads are associated with circuitry included in the element represented by the block whose operation is not described in detail herein, but is described elsewhere, as indicated in the detailed description.

The cables and leads of the drawing are given numerical designations, the first digit or digits of which indicate the number of the figure of the drawing on which they originate and the last two digits of which indicate the numerical designation of the particular cable or lead. For example, cable 513 identifies the cable extending from sender 502 on FIG. 5 to sender connector 503 on FIG. 5. Where a cable is separated into its components of smaller cables or leads, a new numerical designation is given to each component at the point of separation.

Those circuit components which are shown in block diagram form are given numerical designations, the first digit or digits of which indicate the figure of the drawing on which they are located. Since certain of these components are shown in varying degrees of detail in separate figures, the original numerical designation of the circuit component is often retained regardless of figure number. However, a number in parenthesis following the original numerical designation is used to indicate the figure referred to in the description. For example, recorder circuit 411(8) identifies the recorder circuit which is initially shown on FIG. 4 and of which certain details are shown on FIG. 8.

*Circuit Components*

The following is a table of items of equipment shown in the drawing which are also shown in one or more of the above-mentioned Patents 2,585,904 to Busch, 2,587,817 to Busch et al. and 2,599,358 to Cahill et al. Each relay is cross-referenced from its location in the drawing of this application to the corresponding location in the other patents.

| Relay | This Appln. | Patent 2,585,904, Busch | Patent 2,587,817, Busch et al. | Patent 2,599,358, Cahill et al. |
|---|---|---|---|---|
| Marker 501: | | | | |
| SOG | 11 | 128 | ---------- | ---------- |
| CRV | 11 | ---------- | ---------- | ---------- |
| CGR | 11 | ---------- | ---------- | ---------- |
| TOG1 | 11 | 128 | 24 | ---------- |
| TER | 11 | 128 | 23 | ---------- |
| R3 | 11 | 135 | ---------- | ---------- |
| R4 | 11 | ---------- | 23 | ---------- |
| DIS1 | 12 | 114 | 23 | ---------- |
| FG0–FG1 | 12 | 23 | 27 | ---------- |
| TF0–TF7 | 12 | 152 | 27 | ---------- |
| RGT0–RGT7 | 15 | ---------- | ---------- | ---------- |
| RGU0–RGU7 | 15 | ---------- | ---------- | ---------- |
| SIA | 15 | 181 | ---------- | ---------- |
| SIB | 15 | 202 | ---------- | ---------- |
| OSG0–OSG4 | 15 | 202 | 24 | ---------- |
| OS0–OS4 | 15 | 180 and 201 | ---------- | ---------- |
| TRN | 15 | ---------- | 26 | ---------- |
| HN0–HN7 | 15 | ---------- | 26 | ---------- |
| T0–T7 | 15 | ---------- | 26 | ---------- |
| U0–U7 | 15 | ---------- | 26 | ---------- |
| TG0–TG9 | 15 | 133 | ---------- | ---------- |
| TB0–TB6 | 15 | 133 | ---------- | ---------- |
| TS0–TS9 | 15 | 62 | ---------- | ---------- |
| R12 | 11 | ---------- | ---------- | ---------- |
| GCK | 12 | ---------- | ---------- | ---------- |
| TRST | 15 | 171 | ---------- | ---------- |
| GPS | 10 | ---------- | ---------- | ---------- |
| Inc. Reg. Mkr. Con. 507 | ---------- | ---------- | 1 | ---------- |
| RS3 | 16 | 88 | ---------- | ---------- |
| RA3 | 16 | 143 | ---------- | ---------- |
| MS1 | 16 | 24 | ---------- | ---------- |
| MC1 | 16 | 164 | ---------- | ---------- |
| Tand. Inc. Trunk 404 | 9 | ---------- | 5, 6, and 7 | ---------- |
| F | 9 | ---------- | 5 | ---------- |
| IN | 9 | ---------- | 5 | ---------- |
| GPST | 9 | ---------- | ---------- | ---------- |
| STP | 9 | ---------- | ---------- | ---------- |
| GCR | 9 | ---------- | ---------- | ---------- |
| GST | 9 | ---------- | ---------- | ---------- |
| Outgoing Trunk 401 | 6 | 217 | ---------- | ---------- |
| IE | 6 | ---------- | ---------- | ---------- |
| S1 | 6 | 217 | ---------- | ---------- |
| SPR | 6 | ---------- | ---------- | ---------- |
| CH | 6 | 217 | ---------- | ---------- |
| D | 6 | 217 | ---------- | ---------- |
| TC | 6 | 217 | ---------- | ---------- |
| MA | 6 | 217 | ---------- | ---------- |
| SPE | 6 | ---------- | ---------- | ---------- |
| RK | 6 | ---------- | ---------- | ---------- |
| S2 | 6 | 217 | ---------- | ---------- |
| Trunk Ident. 413: | | | | |
| UA0–UA9 | 7 | ---------- | ---------- | 48 |
| TA0–TA9 | 7 | ---------- | ---------- | 45 |
| Recorder 411: | | | | |
| M | 8 | ---------- | ---------- | 61 |
| B0–B7 | 8 | ---------- | ---------- | 63 |
| C0–C7 | 8 | ---------- | ---------- | 63 |
| D0–D7 | 8 | ---------- | ---------- | 63 |
| LC | 8 | ---------- | ---------- | 56 |
| RD | 8 | ---------- | ---------- | 56 |
| CTE | 8 | ---------- | ---------- | ---------- |

*Outgoing Call—Originating Switching Center*

A detailed description of the circuit operations entailed in establishing an outgoing call connection in a crossbar telephone system is included in Patent 2,585,904 to A. J. Busch of February 19, 1952 (col. 104, line 10 et seq.). Frequent references will be made to the Busch patent in the following description. Patent 2,599,358 to H. D. Cahill et al. of June 3, 1952, discloses the circuit operations entailed in making a perforated tape call data record for outgoing calls switched in the telephone system disclosed in the Busch patent. Frequent references will be made to the Cahill et al. patent in the following description.

It is assumed that the outgoing call has progressed in the originating switching center 1 to the condition wherein the marker 501-1 has selected a sender 502-1 and an outgoing trunk 401-1 and has established a connection from the sender 502-1 through the sender link 504-1 to the outgoing trunk 401-1. The operation of relay SOG(11) is described in the Busch patent (col. 109, line 29 et seq.).

*Connection of Receiver*

As described in the Busch patent and further described in the copending application Serial No. 134,633 of J. W. Gorgas et al., the marker 501-1 includes a route translator and screening circuit 1101 which, in response to a called station directory number, the calling station class of service, and the type of traffic requested by the calling station user, connects ground to one of a plurality of code points 1102, 1103, 1104, 1105, and 1106, each of which represents a particular type of call to a particular destination. It is now assumed that code point 1102 is grounded and that code point 1102 represents a call destination and a type of traffic for which a complete call progress record is desired. The ground on code point 1102 is extended through a cross-connection 1107, a make contact of relay SOG(11) and the winding of relay CRV(11), thereby operating connect-receiver relay CRV(11). Relay CRV (11) in operating extends ground through its operated contact, over lead 1108, through cable 512, sender connector 503, cable 513, sender 502, cable 514, sender link 504, cable 515, over lead 1108(6) and through the winding of receiver-connect relay IE(6) to battery in the selected outgoing trunk 401–1(6), thereby operating relay IE(6).

The circuit operations of an outgoing trunk 401-1(6) are fully described in the patent to Busch (FIG. 217) and will not be detailed herein. Relay IE(6) in operating extends ground through its make contact, through a make contact of relay S1(6) and through the winding of special-record relay SPR(6) to battery, thereby operating relay SPR(6). Relay SPR(6) is held operated by ground extending through a make contact of relay S1(6), a break contact of relay CH(6), a make contact of relay SPR(6) and through the winding of relay SPR(6) to battery. Relay SPR(6) in operating extends battery through a make contact thereof, a break contact of relay RK(6), over lead 601 and through the winding of a trunk-preference relay TP9(7) associated with the selected outgoing trunk 401–1(6) in the receiver link circuit 402–1(7).

The receiver link circuit 402–1(7) comprises a crossbar switch 701 and associated control circuitry whose operation is similar to the operation of the incoming register link circuit 506-1 as described in the Busch patent (col. 150, line 25 et seq.). The outgoing trunks are connected to the verticals of the switch, and the receivers to the horizontals. Each trunk has an associated preference relay, such as relay TP9(7), and all of the preference relays are arranged in a preference chain with a common start lead to the receivers. Each receiver has a preference relay, such as RP0(7), and a receiver busy relay, such as RB0(7). The operations of the receiver link circuit 402–1(7) are analogous to those of the incoming register link circuit of the Busch patent and will not be described in detail herein.

The operation of hold magnet H9(7), which is associated with the selected outgoing trunk 401–1(6), and select magnet SM0, which is associated with a selected receiver 403–1 closes crosspoint 702 on the crossbar switch 701 of the receiver link circuit 402–1(7), and extends ground through a make contact of hold magnet H9(7), over lead 703 and through the winding of receiver-check relay RK(6) in the selected outgoing trunk 401–1(6) to battery, thereby operating relay RK(6). Hold magnet H9(7) is held operated by extending ground in the outgoing trunk 401–1(6) through a make contact of relay S1(6), a make contact of relay SPR(6), a make contact of relay RK(6), over lead 704 to the receiver link circuit 402–1(7) and through the winding of hold magnet H9(7) to battery.

Crosspoint 702 of the receiver link circuit 402–1(7), in closing, extends leads 602, 603, and 604 from the outgoing trunk 401–1(6) through cable 605, crosspoint 702, and cable 705 to the call data signal receiver 403–1(8), thereby connecting the receiver 403-1(8) to the selected outgoing trunk 401–1(6).

The pulse recorder 405–1(8) of the receiver 403–1(8) is now directly connected through the receiver link circuit 402–1(7) and over leads 602 and 603 to the tip and ring conductors, 606 and 607 respectively, of the outgoing trunk 401–1(6).

The patent to Busch (col. 108, line 50 et seq.) fully describes the connection of a sender 502–1 to a selected outgoing trunk 401–1. The selected sender 502–1 may comprise a multifrequency sender similar to that described in Patent 2,564,441 to B. McKim et al. of August 14, 1951. The Busch patent further describes the supervisory circuit operations in the sender 502–1 and the outgoing trunk 401–1 which result in the transmission of call information from the sender 502–1 over the tip and ring conductors 606 and 607 of the outgoing trunk 401–1(6) to a distant switching center. As described in the Busch patent, during this transmission relay D(6) of the outgoing trunk circuit 401–1(6) is operated, thereby divorcing the tip and ring conductors 606 and 607 of the trunk 401–1(6) from the calling station 400–1 (col. 125, line 71 et seq.). The multifrequency pulses transmitted by the sender 502–1 to the distant office are also transmitted over leads 602 and 603, through cable 605, crosspoint 702 of the receiver link circuit 402(7), and cable 705 and over leads 602 and 603 to the pulse recorder 405–1(8) in the signal receiver circuit 403–1(8). The call information is recorded in the pulse recorder 405–1 (8) in the form of audible multifrequency signals, thereby providing a record of the call destination and other pertinent call information as it is transmitted to the distant switching center.

*Call Diversion Record*

The above-mentioned patent to Cahill et al. describes the circuitry of a trunk identifier 413–1 and a recorder 411–1, in addition to other circuits, and no detailed description thereof will be included herein below. Only those elements necessary for an understanding of this invention will be described.

The receiver 403–1(8) includes a call-diverted signal detector 409–1(8) which is responsive to a unique signal indicating a call diverted from the tandem switching center 2. Upon detecting a call-diverted signal, a circuit is completed for the operation of spillover-record relay SOR(8) which extends from ground through the call-diverted signal detector 409–1(8) and the winding of relay SOR(8) to battery. Relay SOR(8), in operating, connects switching center identification receiver and register 410–1(8) to leads 602 and 603 through make contacts of relay SOR(8). Relay SOR(8) is held operated through a break contact of relay DR(8) and a make contact of relay SOR(8).

As will be described in more detail herein below, the generator 508–2 at the tandem switching center 22 is arranged to transmit a switching center identification signal immediately following the call-diverted signal. The operation of relay SOR(8) prepares the switching center identification receiver and register 410–1 for the reception and registration of the switching center identification signals. Switching center identification receiver and register 410–1 may comprise a multifrequency register similar to that disclosed in Patent 2,564,441 to B. McKim et al. of August 14, 1951. Upon receipt of the switching center identification signals, a circuit is completed from ground through switching center identification receiver and register 410–1, a break contact of relay CI0(8) and the winding of digits-received relay DR(8) to battery, thereby operating relay DR(8). The operation of relay DR(8) opens the above-described holding circuit for relay SOR(8) allowing it to release, and thereby disconnecting leads 602 and 603 from switching center identification receiver and register 410–1(8).

Relay SOR(8) in operating also extends ground through its make contact, over lead 604, through cable 705, crosspoint 702 of the receiver link circuit 402–1(7), cable 605 and over lead 604 to the outgoing trunk 401–1(6).

The Busch patent (col. 147, line 30 et seq.) describes the charging operations in an outgoing trunk circuit such as 401–1(6). Reference to the Busch patent will disclose that relay TC(6) is operated after the completion of an initial entry of call data by the call data recording equipment 408–1. The previously described ground on lead 604 is extended, therefore, through a make contact of relay TC(6), a break contact of relay SPE(6) and through the winding of relay SPE(6) to battery, thereby operating special-entry relay SPE(6). Relay SPE(6) in operating initiates the establishment of a connection to the trunk identifier 413–1(7) to identify the outgoing trunk 401–1(6) to the recorder circuit 411–1(8). These connections and their function are fully described in the patents to Busch and to Cahill et al. and will not be described in detail herein. The Busch patent (col. 148, line 33 et seq.) describes the operation of relay MA(6) in the outgoing trunk 401–1(6) in response to the answer of a called station 400–3. Relay SPE(6) performs a function similar to that of relay MA(6) by extending leads, 610 and 612, from the outgoing trunk 401–1(6) to the trunk identifier 413–1(7).

The recorder entry, made in response to the answer of a called station is described in the Cahill et al. patent and includes indicia identifying the outgoing trunk 401–1 and the time of called station answer. In the present invention the call-diverted entry includes the indicia identifying the outgoing trunk 401–1 but substitutes the identification of the tandem switching center 2, from which the call is diverted, for the time indication.

The Cahill et al. patent (col. 21, line 5 et seq.) describes the operation of trunk identification relays UA0(7)–UA9(7) and TA0(7)–TA9(7) in the trunk identifier circuit 413–1(7), which relays identify the outgoing trunk 401–1(6) to the recorder circuit 411–1(8). The operation of relays TA0(7) and UA9(7), which identify the outgoing trunk 401–1 as No. 09, completes a circuit extending from ground in the recorder 411–1(8) through the winding of cancel-time-entry relay CTE(8), over lead 801, through make contacts of relays UA9(7) and TA0(7) in the trunk identifier circuit 413–1(7), over lead 706, through cable 605, crosspoint 702 of the receiver link circuit 402–1(7), and cable 705, over lead 802 through a make contact of relay DR(8) and the winding of relay CI0(8) in the receiver circuit 403–1(8) to battery, thereby operating relay CI0(8) in the receiver circuit 403–1(8) and relay CTE(8) in the recorder 411–1(8). Relay CI0(8) is individually associated with receiver 403–1. Other CI- relays are provided in association with other receivers. Relay CI0(8) in operating completes an obvious holding circuit for relay DR(8).

The patent to Cahill et al. describes the recording of trunk identifying indicia by the recorder 411–1(8) and no description thereof will be included herein. The patent to Cahill et al. (col. 32, line 9 et seq.) further describes circuit operations required to record the time of answer wherein relay M(8) is operated in the recorder 411–1(8) and, by its operation, extends ground through its make contacts and break contacts of relay CTE(8) to a timing selector 803 and thence through the windings of appropriate recording control relays B0(8)–B7, C0–C7, and D0–D7. The operation of relay CTE(8) removes this ground from the make contacts of relay M(8) thereby disabling the leads extending from the timing selector 803–1 to the windings of the recorder control relays. The operation of relay CI0(8) extends ground through its make contacts to the windings of the appropriate recording control relays B0(8)–B7(8), C0(8)–C7(8), and D0(8)–D7(8). Assuming that the identifying number of the tandem switching center 2 from which the call is diverted is 7, a circuit is completed from ground in the receiver 403–1(8) through switching center identification receiver and register 410–1(8) through cable 804, and make contacts of relay CI0(8), over leads 805 and 806, through cable 807 to the recorder 411–1(8), over leads 805 and 806 and through the windings of relays B0(8) and B7(8), thus operating relays B0(8) and B7(8) and causing the switching center identification number 7 to be substituted for the time indication in this special call-diverted data record.

The patent to Cahill et al. describes the operation of recorder-disconnect relay RD(8) upon the completion of recording and entry by the recorder 411–1. The Cahill et al. patent further describes the release of the recorder 411–1(8) and the trunk identifier 413–1(7) in response to the operation of relay RD(8). Relays UA9(7) and TA0(7) in the trunk identifier 413–1(7) release when relay RD(8) is operated, thereby opening the previously described circuit extending through the windings of relays CTE(8) of the recorder 411–1(8) over lead 801 and through the winding of relay CI0(8) in the receiver 403–1(8). Relay CI0(8) in the receiver 403–1(8) releases, thus disconnecting the receiver 403–1(8) from the recorder 411–1(8).

As described in the patent to Cahill et al. (col. 32, line 47 et seq.), when the entry has been completed, low resistance ground is connected through a make contact of relay LC(8) to lead 609 (Busch patent col. 148, line 59) which is connected in shunt of the winding or relay SPE(6) thereby causing relay SPE(6) to release and the recording equipment 408–1 to be dismissed.

*Release of Receiver Circuit*

The receiver 403–1(8) remains connected through the receiver link circuit 402–1(7) to the outgoing trunk 401–1(6) and receives and records the switching center and switching equipment identification signals from each tandem switching center through which the call is switched and from the terminating switching center to which the call is directed. As described in the Busch patent (col. 147, line 69 et seq.), relay CH(6) in the outgoing trunk circuit 401–1(6) will operate in response to an answer by the called station 400–3. Relay CH(6) in operating releases the above-described holding circuit for relay SPR(6) which extended from ground through a make contact of relay S1(6), a break contact of relay CH(6), a make contact of relay SPR(6) and the winding of relay SPR(6) to battery. Relay SPR(6) in releasing removes the ground from lead 704 which, as previously described, held the hold magnet H9(7) operated in the receiver link circuit 402–1(7), thus releasing hold magnet H9(7). Hold magnet H9(7) in releasing opens crosspoint 702 of the receiver link circuit 402–1(7), thereby disconnecting the receiver 403–1(8) from the outgoing trunk 401–1(6).

*Tandem Call—Tandem Switching Center—Tandem Incoming Trunk Seizure*

The circuit operations required for the completion of a tandem call in a crossbar telephone system are fully described in Patent 2,587,817 to Busch et al. supra. Frequent reference thereto will be made in the following description.

The circuit operations of the tandem incoming trunk 404–2 following its seizure from the originating switching center 1, which include the operation of relay IN(9), are fully described in the patent to Busch et al. (col. 4, line 21 et seq.). In response to this seizure, a connection is established from the tandem incoming trunk 404–2 through the incoming register link 506–2 to an incoming register 505–2, as described in the patent to Busch et al. The incoming register 505–2 returns a start-pulsing signal to the sender 502–1 at the originating switching center 1 and receives and registers the call information pulsed therefrom. Upon receipt of the call information, the incoming register 505–2 initiates the establishment of a connection to a marker 501–2 through the incoming register marker connector 507–2. The above circuit operations are described in the patent to Busch et al. and will not be detailed herein.

The incoming register marker connector 507–2(16) is described in detail in the aforementioned patent to Busch (col. 164, line 55 et seq.). In response to a start signal from the incoming register 505–2, a register preference relay, such as RS3(16), is operated in the incoming register marker connector 507–2(16). Relay RS3(16) in operating, completes a circuit for the operation of a multicontact connector relay RA3(16), which is individually asosciated with the incoming register 505–2. The Busch patent further describes the operation of a marker preference relay, such as MS1(16), which in turn completes a circuit for the operation of multicontact connector relays, such as MC1(16), each of which is individually associated with a single marker. The operation of relay RA3(16) and relay MC1(16) establishes a connection from the incoming register 505–2 to the selected marker 501–2 through cables 1601, 1613 and 516.

*Transfer of Information to Marker*

Several items of call information and switching equipment identifying information are forwarded through the above-described connection from the incoming register 505–2 to the marker 501–2. The Busch patent (col. 167, line 19 et seq.) describes the transfer of the called station directory number and the number of the trunk link frame 406–2 on which the tandem incoming trunk 404–2 appears from the incoming register 505–2 to the marker 501–2. The trunk link frame number is registered in the marker 501–2(12) through the operation of one of the frame-tens relays, such as FG0(12), and two of the five frame-units relays TF0(12)–TF7(12), such as relays TF2(12) and TF7(12).

The patent to Busch et al. (col. 25, line 2 et seq.) also describes receipt by the marker 501–2 of the three digit arbitrary number assigned to the tandem incoming trunk 404–2. The identity of the tandem incoming trunk 404–2 is registered in the marker 501–2(15) through the operation of two of the five hundreds-digit relays HN0(15)–HN7(15), two of the five tens-digit relays T0(15)–T7(15) and two of the five units-digit relays U0(15)–U7(15).

The incoming register 505–2 is identified to the marker 501–2(15) from the incoming register marker connector 507–2(16). Relay RA3(16), since it is unique to one incoming register 505–2, is used to identify the incoming register 505–2 to the marker 501–2. Ground applied over cross-connections 1602, 1603, 1605, and 1606 and through make contacts of relay RA3(16) is extended through make contacts of relay MC1(16), over leads 1604, 1607, 1611, and 1612, through cable 1601, and through the windings of relays RGT4(15), RGT7(15), RGU1(15) and RGU2(15), thereby operating these relays and identifying incoming register 505–2 as No. 03.

As previously described in the outgoing call description, the marker 501–2 ascertains from the call information forwarded to it by a register, such as the incoming register 505–2, the destination of the call and the type of trunk which must be used to complete the call. As a result of this translation in the route translator and screening circuit 1101, ground is extended to code point, such as code point 1104. It is assumed that the incoming call to the tandem switching center 2 is not directed to a station served by the tandem switching center 2 but rather is directed to a station 400–3 served by the terminating switching center 3. The Busch et al. patent (col. 21, line 59 et seq.) describes the operation of tandem outgoing relay TOG1(11) in response to this type of call. Ground is now extended from the code point 1104 through a cross-connection 1112, a make contact of relay TOG1(11) and the winding of connect-generator relay CGR(11) to battery, thereby operating relay CGR(11). The provision or omission of cross-connections from code points determines whether or not a complete call progress record is required for the call. As each code point is associated with a particular route, call records are made only of those routes for which they are desired. Other call information may be similarly used as criteria for requiring a complete call progress record to be made.

The patent to Busch et al. (col. 22, line 19, et seq.) describes the operation by the marker 501–2 of the positive or lower half of relay F(9) in the tandem incoming trunk circuit 404–2(9) during tandem call switching operations. The circuit for operating relay F(9) extends from the tandem incoming trunk 404–2(9) through cable 517, the incoming register link 506–2, cable 518, the incoming register 505–2, cable 516, the incoming register marker connector 507–2 and cables 1601 and 519 to the marker 501–2.

*Connection of Generator to Tandem Incoming Trunk*

The operation of connect-generator relay CGR(11) in the marker 501–2(11) completes a circuit, paralleling that provided for the operation of relay F(9) in the tandem incoming trunk 404–2(9), for the operation of generator-connect relay CGR(9) in the tandem incoming trunk 404–2(9). This circuit extends from ground in the marker 501–2(11) through a make contact of relay CGR(11), over a lead 1109, through cable 1601, the incoming register marker connector 507–2(16), cable 516, the incoming register 505–2, cable 518, the incoming register link 506–2 and cable 517, over lead 1109 and through the winding of relay GCR(9) in the tandem incoming trunk 404–2(9) to battery, thereby operating relay GCR(9).

The operation of relay GCR(9) extends ground through a make contact thereof, a break contact of relay STP(9) and the winding of generator-start relay GST(9) to battery, thereby operating relay GST(9). A holding path for relay GST(9) is provided which extends from battery through the winding of relay GST(9), a break contact of relay STP(9), a make contact of relay GST(9) and a make contact of relay IN(9) to ground.

The operation of relay GST(9) extends battery through an operated contact thereof and a break contact of relay GK(9), over lead 909, through cable 910, over lead 909, and through the winding of a trunk preference relay such as TP1(13), which is individually associated with the tandem incoming trunk 404 in the generator link circuit 407–2(13).

The generator link circuit 407–2(13) is similar in operation to the previously described receiver link circuit 402–1. Furthermore, both generator and receiver link circuits 407–2 and 402–1 are similar to the incoming register link circuit 506–1 as described in the Busch patent (col. 150, line 25 et seq.). It is therefore not necessary to describe in detail the operations of the generator link circuit 407–2.

One generator link circuit is provided for each trunk link frame. Each generator link circuit comprises a crossbar switch and associated preference and control circuitry. The trunks are connected to the verticals of the switches and the generators to the horizontals. Each trunk has an associated preference relay, such as TP1(13), and each generator has a preference relay, such as GP0(13), and a generator-busy relay, such as GB0(13). An idle generator is connected by the generator link circuit 407–2(13) to the tandem incoming trunk 404–2(9)

through the operation of a select magnet, such as SM0(13), which is associated with the selected generator 508-2, and a hold magnet, such as HM1(13), which is associated with the tandem incoming trunk 404-2(9). Hold magnet HM1(13) in operating extends ground over lead 907, through cable 910, over lead 907 and through the winding of generator-check relay GK(9) in the tandem incoming trunk 404-2(9) to battery, thereby operating relay GK(9). A holding path is provided for hold magnet HM1(13) extending from battery through its winding, over lead 908, through cable 910, over lead 908, through a make contact of relay GK(9), a make contact of relay GST(9) and a make contact of relay IN(9) to ground.

The operation of hold magnet HM1(13) and select magnet SM0(13) closes crosspoint 1301 of the generator link circuit 407-2(13) and extends leads 901, 902, 903, 904, and 905 from the tandem incoming trunk 404-2(9) through cable 906, crosspoint 1301 and cable 1710 to the generator 508-2(17). Ground is extended from the tandem incoming trunk 404-2(9) over lead 903, through cable 906, crosspoint 1301, and cable 1710, over lead 903 and through the winding of relay ON(17) in the generator 508-2(17) to battery, thereby operating relay ON(17).

*Outgoing Equipment Seizure*

The patent to Busch et al. (col. 22, line 52 et seq.) describes the selection and seizure of an outgoing trunk 401-2 and sender 502-2 by the marker 501-2 in accordance with information obtained from the route translator and screening circuit 1101(5). The patent to Busch (col. 108, line 51 et seq.) describes the selection of a sender 502-2 which selection includes the operation of one of the sender group relays OSG0(15)-OSG4(15), one of the two sender subgroup relays SIA(15) or SIB(15) and one of the five sender identifying relays OS0(15)-OS4(15).

The patent to Busch (col. 112, line 28 et seq.) describes the selection of an outgoing trunk 401-2 and the operation of a trunk block relay such as TB0(15), a trunk group relay such as TG0(15), and a trunk select relay such as TS0(15), which relay operations identify the selected outgoing trunk 401-2.

*Connection of Marker to Generator*

The previously described operation of relays FG0(12), TF2(12), and TF7(12), which identified the trunk link frame 406-2 upon which the tandem incoming trunk 404-2 upon which the tandem incoming trunk 404-2 appears, completed a circuit for the operation of a marker preference relay, such as MP1(14), in the preference control circuit 1404 of the generator connector 509-2(14). This circuit extends from battery in the marker 501-2(12) through a break contact of relay DIS1(12), a break contact of relay GPS(10), a make contact of relay FG0(12), a make contact of relay TF2(12), and a make contact of relay TF7(12), over lead 1209, through cable 1202 to the generator connector 509-2 associated with trunk link frame 406(14) and through the winding of marker preference relay MP1(14) to ground.

The generator connector 509-2(14) is similar in operation to the trunk link connector as described in the Busch patent (col. 23, line 12 et seq.). A generator connector is provided for each trunk link frame. In each generator connector there is on marker preference relay, such as relay MP1(14), associated with each marker circuit to which the trunk link frame may be connected. Associated with each trunk link frame are several generators. The operation of relay MP1(14) completes a circuit for the operation of relay MC1(14), extending from ground through a make contact of relay MP1(14) and the winding of relay MC1(14) to battery. The operation of relay MP1(14) further completes a circuit extending from ground through a make contact of relay MP1(14), over lead 1204(14), through cable 1202, over lead 1204 and through the winding of generator-connector-check relay GCK(12) in the marker 501-2(12) to battery, over which circuit relay GCK(12) operates. Relay GCK(12) in operating extends battery through a make contact thereof, over lead 1205, through cable 1202, over lead 1205, through a make contact of relay MC1(14) and through the winding of connector relay MCA1(14) to ground in the generator connector 509-2(14). Relay MCA1(14) is a multicontact relay similar to those described in the Busch patent, and the make contacts thereof extend the leads in cable 1401 from the marker 501-2(10) to the equipment identification register portion of the generator circuit 508-2(18 and 19).

The leads extended through the make contacts of relay MCA1(14) are multiplied to all generators associated with the trunk link frame 406-2 on which the tandem incoming trunk 404-2 appears. However, only those leads which extend to generator 508-2, which is connected through the generator link circuit 407-2 to the tandem incoming trunk 404-2, are enabled through make contacts of relay ON(17) in generator 508-2(18).

*Switching Equipment Information Transfer to Generator*

As previously described, information identifying the pertinent pieces of switching equipment used in the completion of this tandem call is stored in the marker 501-2. This information is now forwarded from the marker 501-2 to the generator 508-2 and registered therein.

The two digit number identifying the incoming register 505-2 used in the call is transferred as two two-out-of-five code indications over circuits extending from ground in the marker 501-2(10) through a make contact of relay GCK(12), make contacts of two of the five relays RGT0(15)-RGT7(15) and two of the five relays RGU0(15)-RGU7(15), through cables 1003 and 1004, cable 1401, make contacts of relay MCA1(14), cable 1802, make contacts of relay ON(17), cable 1801, cables 1003 and 1004, through the windings of two of the five register-tens relays RGT0(18)-RGT7(18) and two of the five register-units relays RGU0(18)-RGU7(18) in the generator 508-2(18) to battery. The incoming register 505-2 used in the call being described is assumed to be number 03 and relays RGT4(18), RGT7(18), RGU1(18), and RGU2(18) will be operated over the above-described circuits.

The sender group number is transferred as a single digit indication over circuits extending from ground in the marker 501-2(10) through a make contact of one of the relays OSG0(15)-OSG4(15), through cable 1007, cable 1401, a make contact of relay MCA1(14), cable 1802, a make contact of relay ON(17), cable 1801, cable 1007, the winding of one of the sender-group relays SG0(18)-SG4(18) in the generator 508-2(18) to battery.

The sender number is transferred as a single digit indication over a circuit extending from ground in the marker 501-2(10) through a make contact of relay GCK(12), a make contact of one of the relays SIA(15) or SIB(15), a make contact on one of the relays OS0(15)-OS4(15), through cable 1008, cable 1401, a make contact of relay MCA1(14), cable 1802, a make contact of relay ON(17), cable 1801, cable 1008, the winding of one of the sender number relays SN0(18)-SN9(18) to battery.

The three digit arbitrary number of the tandem incoming trunk 404-2 is transferred from the marker 501-2 to the generator 508-2 as three two-out-of-five code indications in a manner similar to the above-described transfer of the incoming register number. The trunk block, trunk group, and trunk select information is transferred on a one-out-of-ten basis in a manner similar to that described for the previously described sender number transfer.

The number of the marker 501-2 used for the call is forwarded from the generator connector 509-2(14) to the generator 508-2(18) over a circuit extending from ground in the generator connector 509-2(14), over cross-connection 1403, through a make contact of relay MCA1(18), which, as previously described, is individually associated with the marker 501–2, over lead 1402, through cable 1802, a make contact of relay ON(17), and cable 1801, over lead 1402, through the winding of marker-number relay MN1(18) to battery.

A frame-number relay, such as relay FN0(18), is operated to identify the associated trunk link frame over a circuit extending from battery through the winding of relay FNO(18) over cross-connection 1803 through a break contact of relay ADP(17) and a make contact of relay ON(17) to ground. Cross-connection 1803 is permanently connected to the operating winding of the appropriate FN– (18) relay since only one trunk link frame is associated with each generator.

Holding circuits are provided for all equipment identification register relays which extend from battery through the windings thereof, make contacts thereof, and break contacts of relay ADP(17) to ground.

*Generator Pulsing—Completed Call*

The registration of information identifying each piece of switching equipment in the generator 508–2(18 and 19) is checked by appropriate check circuits 1904–1915 which may advantageously comprise well known two-out-of-five relay combination check circuits 1904–1908 and one-out-of-N relay combination check circuits 1909–1915. Such check circuits are well known in the telephone art and will not be described herein.

Upon receipt and registration of all required equipment identifying information a circuit is completed for the operation of generator pulse start relay GPS(10), in the marker 501–2(10), which extends from battery through the winding of relay GPS(10), a make contact of relay TOG1(11), over lead 1902, through cable 1012, cable 1401, a make contact of relay MCA1(14), cable 1802, a make contact of relay ON(17), cable 1901, cable 1012, over lead 1902, through trunk select check circuit 1915, trunk block check circuit 1914, trunk group check circuit 1913, sender number check circuit 1912, sender group check circuit 1911, marker number check circuit 1910, frame number check circuit 1909, trunk number hundreds, tens, and units check circuits 1908, 1907, 1906, register units check circuit 1905, register tens check circuit 1904, and through a break contact of relay ADP(17) to ground.

The operation of relay GPS(10) opens the previously described operating circuit for relay MP1(14) thereby releasing the generator connector 509–2. This operation is further described hereinbelow.

Relay GPS(10) in operating also completes a circuit for the operation of relay GPST(9) in the tandem incoming trunk 404–2(9)extending from battery through the winding of relay GPST(9) and a make contact of the lower winding of relay F(9), over lead 1203, through cable 517, the incoming register link 506–2, cable 518, the incoming register 505–2, cable 516, the incoming register marker connector 507–2(16), a make contact of relay RA3(16), a make contact of relay MC1(16), cable 1613, cable 1601, cable 1201, over lead 1203 and through a make contact of relay GPS(10) to ground. A holding circuit is provided for relay GPST(9) extending from battery through the winding thereof, a make contact thereof, and a make contact of relay IN(9) to ground.

The patent to Busch et al. (col. 27, line 33 et seq.) describes the release of relay F(9) in the tandem incoming trunk 404–2(9) by the marker 501–2. Upon the release of relay F(9), a circuit is completed for the operation of start-pulsing relay SP(17) in the pulsing control 1703 of the generator 508–2(17), which extends from battery through the winding of relay SP(17) and a break contact of relay TRBL(18), over lead 904, through cable 1710, crosspoint 1301 of the generator link circuit 407–2(13) and cable 906, over lead 904, through a make contact of relay GPST(9), a break contact of the lower winding of relay F(9), a break contact of the upper winding of relay F(9) and a make contact of relay IN(9) to ground.

*Generator Circuit*

The generator 508–2 is similar in operation to the multifrequency sender disclosed in the Patent 2,564,441, to B. McKim et al. of August 14, 1951. It comprises a source of multifrequency signals 1706, an equipment identification register (FIGS. 18 and 19), a steering and sequence circuit 1705, and a pulsing control circuit 1703. The multifrequency signal source 1706 provides an output of six frequencies, 700 c.p.s. 900 c.p.s. 1100 c.p.s. 1300 c.p.s. 1500 c.p.s. and 1700 c.p.s., which are concurrently applied to the steering and sequence control circuit over leads 1700, 1701, 1702, 1704, 1707, and 1708. The steering and sequence control circuit 1705 transmits two of the six frequencies in accordance with the call information stored in the generator 508–2(18 and 19) over leads 901 and 902, which are connected to the tip and ring conductors 911 and 912 of the tandem incoming trunk 404(9) through the generator link circuit 407(13). The transmission of two of the six frequencies provides a code of information as follows:

| Signal Information | Frequency, c.p.s. | | | | | |
|---|---|---|---|---|---|---|
| | 700 | 900 | 1,100 | 1,300 | 1,500 | 1,700 |
| Digit: | | | | | | |
| 0 | ------ | ------ | ------ | x | x | ------ |
| 1 | x | x | ------ | ------ | ------ | ------ |
| 2 | x | ------ | x | ------ | ------ | ------ |
| 3 | ------ | x | x | ------ | ------ | ------ |
| 4 | x | ------ | ------ | x | ------ | ------ |
| 5 | ------ | x | ------ | x | ------ | ------ |
| 6 | ------ | ------ | x | x | ------ | ------ |
| 7 | x | ------ | ------ | ------ | x | ------ |
| 8 | ------ | x | ------ | ------ | x | ------ |
| 9 | ------ | ------ | x | ------ | x | ------ |
| Trouble Encountered | x | ------ | ------ | ------ | ------ | x |
| Call Diverted | ------ | x | ------ | ------ | ------ | x |

The steering and sequence control circuit 1705 also controls the sequence in which equipment identifying signals are transmitted over leads 901 and 902. This information is transmitted in the following sequence: trouble-encountered signal when required, call-diverted signal when required, switching center number, trunk link frame number, marker number, incoming register tens digit, incoming register units digit, tandem incoming trunk hundreds digit, tandem incoming trunk tens digit, tandem incoming trunk units digit, sender group number, sender number, outgoing trunk group number, outgoing trunk block number, outgoing trunk select number.

The steering and sequence circuit 1705 is arranged so that the transmission of the last item of information registered in the generator 508–2(18 and 19) will cause the operation of all-digits-pulsed relay ADP(17) in the pulsing control circuit 1703.

The previously described operation of relay SP(17) in the pulsing control circuit 1703 extends ground through a make contact of relay SP(17) to the steering and sequence circuit 1705, thereby initiating the transmission of equipment identifying signals over leads 901 and 902 through the generator link 407–2(13) and thence back over the call connection to the pulse recorder 405–1 at the originating switching center 1.

*Generator Pulsing—Overflow or Trouble Condition*

The patent to Busch (col. 204, line 23 et seq.) describes the operation of trouble-recorder-start relay TRST(15) of the marker 501–2(15) in the event that a call is not properly completed due to a trouble condition. The Busch patent (col. 207, line 52 et seq.) further describes the operation of overflow route relay R3(11) in the marker 501–2(11) in the event that a blockage occurs in a switching center due to an all equipment busy condition. The operation of the trouble recorder circuit 510–2 is described in Patent 2,508,052 to O. H. Williford of May 16, 1950.

The operation of either relay TRST(15) or relay R3(11) in the marker 501-2 completes a circuit for the operation of trouble relay TRBL(18) in the generator 508–2(18) which extends from battery through the winding of relay TRBL(18) over lead 1001, through cable 1801, cable 1802, a make contact of relay ON, a make contact of relay MCA1(14) and cable 1401, over lead 1001 and through a make contact of either relay TRST(15) or relay R3(11) to ground. Relay TRBL(18) is held operated over a circuit extending from battery through its winding, a make contact thereof and a break contact of relay ADP(17) to ground.

The operation of relay TRBL(18) bypasses the above-described equipment identification check circuits and immediately extends ground through its make contacts, over leads 1902 and 1903, one of which grounds, as previously described, operates relay GPS(10) in the marker circuit 501-2(10). The operation of relay TRBL(18) further applies ground through a make contact thereof directly to lead 904, causing the immediate operation of start-pulsing relay SP(17) in the pulsing control circuit 1703 of the generator 508-2(17). Lead 904, which is the normal operating circuit for relay SP(17), is opened at a break contact of relay TRBL(18).

As previously described, the operation of relay SP(17) initiates the start of equipment identifying signal transmission over leads 901 and 902 back to the originating switching center 1. Relay TRBL(18) in operating causes the steering and sequence circuit 1705 to transmit frequencies 700 c.p.s. and 1700 c.p.s. indicating that trouble has been encountered and that the call is not being properly completed. This trouble-encountered signal is followed by the transmission of any equipment identifications stored by the generator 508–2(17). When all the information stored in the generator 508–2(18 and 19) has been transmitted, relay ADP(17) is operated as previously described.

*Generator Pulsing—Call Diverted*

The Gorgas et al. application, supra, describes the operation of a route relay, such as R12(11), in the marker 501–2(11) for a call which is diverted from a private tandem switching center to a commercial switching network. The operation of relay R12(11) completes a circuit for the operation of spillover relay SPL(18) in the generator circuit 508-2(18), which circuit extends from battery through the winding of relay SPL(18), over lead 1002, through cable 1801, cable 1802, a make contact of relay ON(17), a make contact of relay MCA1(14), and cable 1401, over lead 1002 and through a make contact of relay R12(11) to ground. Relay SPL(18) in operating causes the steering and sequence circuit 1705 to transmit the frequencies 900 c.p.s. and 1700 c.p.s. indicating that the call has been diverted from the private tandem switching center 2 to a commercial switching network (not shown).

As previously described, the call-diverted signal is immediately followed by the switching center identifying number and, subsequently, by other switching equipment identifying information stored in the equipment identification register of the generator 508-2(18 and 19). The circuit operations initiated in the originating switching center 1 by the detection of the call-diverted signal are described hereinabove in the outgoing call description. Upon the completion of the transmission of all stored information, relay ADP(17) is operated, as previously described.

*Generator Release*

All-digits-pulsed relay ADP(17) is operated by the steering and sequence circuit 1705 when all information stored in the generator 508-2(18 and 19) has been transmitted back to the originating switching center 1. Relay ADP(17) in operating opens the above-described holding circuits for all the equipment identification relays in the generator 508-2(18 and 19), thereby releasing all stored information. The operation of relay ADP(17) also completes a circuit for the operation of stop-pulsing relay STP(9) in the tandem incoming trunk 4–402(9), which extends from battery through the winding of relay STP(9), over lead 905, through cable 906, crosspoint 1301 of the generator link circuit 407–2(13) and cable 1710, over lead 905 and through a make contact of relay ADP(17) in the pulsing control circuit 1703 of the generator 508–2(17) to ground. A holding circuit is provided for relay STP(9) extending from battery through the winding thereof, a make contact thereof and a make contact of relay IN(9) to ground.

Relay STP(9) in operating opens the previously described holding circuit for relay GST(9), thereby releasing relay GST(9). The release of relay GST(9) removes ground from lead 908, over which hold magnet HM1(13) of the generator link circuit 407–2(13) is held operated, thereby releasing hold magnet HM1(13). Hold magnet HM1(13) in releasing opens crosspoint 1301 on the crossbar switch 1302 of the generator link circuit 407–2(13) thereby disconnecting the generator 508–2(17) from the tandem incoming trunk 404–2(9).

Relay GPS(10), which was operated as described above when all pertinent equipment identifications were received from the marker 501–2 by generator 508–2, removed battery from lead 1209, over which relay MP1(14) in the generator connector 509–2(14) was held operated, thereby releasing relay MP1(14). Relay MP1(14) in releasing released relay MC1(14) which, in turn, released relay MCA1(14), thereby disconnecting the marker 501–2(10) from the generator 508–2(18 and 19).

In the event of a trouble condition, the operation of relay DIS1(12), as described in the Busch patent (col. 101, line 3 et seq. and col. 135, line 10 et seq.), releases the generator connector 509–2(14) in a manner similar to its above-described release following the operation of relay GPS(10).

*Incoming Call—Terminating Switching Center 3*

The patent to Busch et al. (col. 31, line 30 et seq.) describes the circuit operations required for the completion of an incoming call. The tandem incoming trunk 404-3 seizure from the tandem switching center 2 and the subsequent circuit operations of the incoming register link 506–3, the incoming register 505–3, the incoming register marker connector 507–3, and the marker 501–3 occur in a manner similar to that described above in the tandem call description. The major exception to the similarity with the above-described tandem call is the ascertainment by the marker 501–3(11) in its route translator and screening circuit 1101 that the call is directed to a station 400-3 served by the terminating switching center 3 and is not to be switched through the terminating swtching center 3 as it was switched through tandem switching center 2.

A connection is established from the tandem incoming trunk 404–3(9) to the generator 508–3(17) through the generator link circuit 407–3(13) as previously described, and a connection is established from the marker 501–3-(10) to the generator 508–3(18 and 19) through the generator connector 509–3(14) as previously described. Switching equipment identifying information is forwarded to the generator 508–3(18 and 19) from the marker 501–3(10) as described for the tandem call with the exception that outgoing trunk block, outgoing trunk group, outgoing trunk select, sender group, and sender number information is not forwarded to the generator 508–3(18 and 19). This information is not available since it is associated with switching equipment used for calls leaving the switching center 3 which is not used for calls terminating in the switching center 3.

The operation of terminating relay TER(11) during incoming call switching operations is fully described in the patent to Busch (col. 166, line 57 et seq.). The circuit for operating relay GPS(10) in the marker 501–3-(10), which was described for the tandem call and which criteria, and said second marker controls said second connecting means in accordance with established call routing criteria.

8. A telephone switching system in accordance with claim 4 wherein said second marker further comprises means for generating a call-failure signal when a call fails to be completed to the requested destination, and wherein said generator is responsive to said call-failure signal to transmit a trouble-encountered signal prior to transmitting said transferred call data; said recording means responsive to said trouble-encountered signal to record said transmitted call data in association therewith.

9. A telephone switching system comprising a first, a second, and a third switching center; a first trunk connecting said first and second switching centers; a second trunk connecting said second and third switching centers; means for establishing a call connection between said first and third switching centers over said first and second trunks; said second switching center comprising an incoming trunk circuit associated with said first trunk, a call data signal generator, a second marker comprising a call data register and means for generating a special-entry signal when a call from said first switching center over said first trunk is routed to said third switching center over said second trunk, means controlled by said second marker for transferring call data from said call data register to said generator, second connecting means controlled by said second marker for connecting said generator to said incoming trunk circuit, said generator responsive to said special-entry signal to transmit a call-diverted signal through said second connecting means and said incoming trunk circuit back over said first trunk to said first switching center, said generator responsive to said transferring means to transmit a switching center identification signal unique to said second switching center and said transferred call data through said second connecting means and said incoming trunk circuit back over said first trunk to said first switching center; said first switching center comprising an outgoing trunk circuit associated with said first trunk, a call data signal receiver, a first marker, first connecting means controlled by said first marker for connecting said receiver to said outgoing trunk circuit, and first recording means associated with said receiver for recording said call-diverted signal, said switching center identification signal and said transmitted call data.

10. A telephone switching system in accordance with claim 9 wherein said call data comprises switching equipment identification signals which identify particular components of switching equipment used in switching said call in said second switching center.

11. A telephone system in accordance with claim 9 wherein said first switching center further comprises second recording means for recording indicia representative of the identity of a calling station, the identity of said outgoing trunk circuit, the time of called station answer and the time of called or calling station disconnect; said receiver responsive to said call-diverted signal to control said second recording means in recording indicia representative of said second switching center in accordance with said switching center identification signal in association with said indicia representative of the identity of said outgoing trunk circuit.

12. A telephone switching system comprising a first and a second switching center connected by a trunk, and means for establishing a call connection between said switching centers over said trunk; said second switching center comprising a plurality of uniquely identifiable switching equipment components for switching calls in said switching center, and means responsive to a call over said trunk from said first switching center for transmitting signals identifying the particular switching equipment components of said plurality used in switching said call in said second switching center back over said call connection to said first switching center; said first switching center comprising means responsive to said signals for recording the identities of said particular switching equipment components.

13. A telephone switching system comprising a first and a second switching center connected by a trunk, means for establishing a call connection between said switching centers over said trunk; said second switching center comprising a plurality of uniquely identifiable switching equipment components for switching a call received over said trunk from said first switching center, means for registering the identities of those of said equipment components which are used in switching said call, means controlled by said registering means for transmitting equipment identifying signals in accordance with said registered component identities and a switching center identification signal unique to said second switching center back over said trunk to said first switching center; said first switching center comprising recording means and means for selectively associating said recording means with said trunk, said recording means responsive to said transmitted signals to make a record thereof.

14. A telephone switching system comprising an originating, a tandem, and a terminating switching center, means for establishing a first call connection between said originating and said tandem switching centers, means for establishing a second call connection between said tandem and said terminating switching centers; said tandem switching center comprising means responsive to a call from said originating switching center over said first call connection directed to said terminating switching center for establishing a tandem switching connection between said first call connection and said second call connection, said tandem switching connection establishing means comprising a first plurality of uniquely identifiable switching equipment components, first generator means responsive to said call for generating a first signal unique to said tandem switching center and for generating second signals identifying the particular switching equipment components of said first plurality used in establishing said tandem switching connection, first connecting means for transmitting said first and second signals from said first generator means back over said first call connection to said first switching center; said first switching center comprising means responsive to said first and second signals for recording the identity of said tandem switching center and the identities of said particular switching equipment components of said first plurality.

15. A telephone switching system in accordance with claim 14 wherein said first generator means is responsive to a failure by said tandem switching connection establishing means in establishing said tandem switching connection to generate a first trouble-encountered signal prior to the generation of said first and second signals, said first connecting means transmitting said first trouble-encountered signal and said first and second signals back over said first call connection to said first switching center; said recording means responsive to said first trouble-encountered signal to record said first trouble-encountered signal in association with said identity of said tandem switching center and said identities of said particular switchng equipment components of said first plurality.

16. A telephone switching system in accordance with claim 15, said terminating switching center comprising means responsive to said call for establishing a terminating switching connection; said terminating switching connection establishing means comprising a second plurality of uniquely identifiable switching equipment components; second generator means responsive to said call for generating a third signal unique to said terminating switching center and for generating fourth signals identifying the particular switching equipment components of said second plurality used in establishing said terminating switching connection; second connecting means for transmitting said third and fourth signals back over said second call connection; said tandem switching connection and said first call connection to said first switching center; said recording means responsive to said third and fourth signals to record the identity of said terminating switching center and the identities of said particular switching equipment components of said second plurality in association with said identity of said tandem switching center and said identities of said particular switching equipment components of said first plurality.

17. A telephone switching system in accordance with claim 16 wherein said second generator means is responsive to a failure by said terminating switching connection establishing means in establishing said terminating switching connection to generate a second trouble-encountered signal prior to the generation of said third and fourth signals; said second connecting means transmitting said second trouble-encountered signal and said third and fourth signals back over said second call connection, said tandem switching connection and said first call connection to said originating switching center; said recording means responsive to said second trouble-encountered signal to record said second trouble-encountered signal in association with said identity of said terminating switching center and said identities of said particular switching equipment components of said second plurality.

18. A telephone switching system comprising a first switching network and a second switching network; said first switching network comprising an originating, a first tandem and a terminating switching center; said second switching network comprising a second tandem switching center; means for establishing a first call connection between said originating and said first tandem switching centers; means for establishing a second call connection between said first tandem and said terminating switching centers; means for establishing a third call connection from said first tandem switching center through said second tandem switching center to said terminating switching center; said first tandem switching center comprising means responsive to a call from said originating switching center over said first call connection which is directed to said terminating switching center for establishing a tandem switching connection between said first and second call connections, said tandem switching connection establishing means further responsive to said call when said second call connection is busy to establish a diverted-call switching connection between said first and third call connections, means responsive to said tandem switching connection establishing means for generating a diverted-call signal as said diverted-call switching connection is being established and for generating a subsequent switching center identification signal unique to said first tandem switching center, means for transmitting said signals back over said first call connection to said originating switching center; said originating switching center comprising means for detecting said diverted-call signal, means responsive to said detecting means for registering said switching center identification signal, and recording means controlled by said registering means for recording indicia representative of said first tandem switching center in accordance with said registered signal.

19. A telephone switching system in accordance with claim 18; said first call connection establishing means comprising a trunk; said originating switching center further comprising means for identifying said trunk to said recording means, said recording means responsive to said trunk identifying means to record indicia representative of the identity of said trunk in association with said indicia representative of said first tandem switching center.

References Cited in the file of this patent

UNITED STATES PATENTS

| | | |
|---|---|---|
| 2,767,246 | Retallack | Oct. 16, 1956 |
| 2,779,824 | Nilsson et al. | Jan. 29, 1957 |
| 2,886,642 | Morris et al. | May 12, 1959 |
| 2,913,526 | Smits et al. | Nov. 17, 1959 |
| 2,976,365 | Young | Mar. 21, 1961 |
| 3,014,987 | Blackhall | Dec. 26, 1961 |